(12) United States Patent
Kando et al.

(10) Patent No.: US 8,172,681 B2
(45) Date of Patent: May 8, 2012

(54) STORAGE MEDIUM HAVING STORED THEREIN GAME PROGRAM AND GAME DEVICE

(75) Inventors: Yuuji Kando, Kyoto (JP); Yutaka Hiramuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1842 days.

(21) Appl. No.: 11/327,351

(22) Filed: Jan. 9, 2006

(65) Prior Publication Data

US 2006/0238498 A1    Oct. 26, 2006

(30) Foreign Application Priority Data

Apr. 26, 2005    (JP) .................................. 2005-127954

(51) Int. Cl.
*A63F 9/24* (2006.01)
*G06F 3/033* (2006.01)

(52) U.S. Cl. ......................................... 463/37; 715/863
(58) Field of Classification Search ................... 715/863; 463/37

See application file for complete search history.

(56) References Cited

U.S. PATENT DOCUMENTS

| | | | | |
|---|---|---|---|---|
| 6,057,845 A | * | 5/2000 | Dupouy | .......................... 715/863 |
| 2005/0198590 A1 | * | 9/2005 | Jarrett et al. | ................... 715/863 |

FOREIGN PATENT DOCUMENTS

JP    2000-245960    9/2000

* cited by examiner

*Primary Examiner* — Corbett B Coburn
(74) *Attorney, Agent, or Firm* — Nixon & Vanderhye P.C.

(57) ABSTRACT

When a player selects an object group displayed on a screen, a related selected area display indicating that the object group is in a selected state is displayed. While the display remains, the player performs an input by drawing a track which intersects the related selected area using a stick or the like. When it is determined that the inputted track and the related selected area intersect, the selected state is released.

14 Claims, 22 Drawing Sheets

FIG. 15

| | FLAG NAME | ON | OFF | NUMBER |
|---|---|---|---|---|
| 255 | TOUCH INPUT FLAG | TOUCHED CONTINUOUSLY | NEW INPUT | ONE |
| 256 | FOCUS FLAG | THE PLAYER CHARACTER IS IN A STATE OF BEING SELECTED (= ENCOMPASSED BY A RED CIRCLE (STANDBY-TO-BE-INSTRUCTED-CIRCLE)) | PLAYER CHARACTER IS NOT SELECTED | PER EACH CHARACTER |
| 257 | IN-OPERATION FLAG | THE PLAYER IS IN-OPERATION WITH FOCUS CHARACTER (A YELLOW CIRCLE (OPERATION CIRCLE) IS DISPLAYED) | THE PLAYER IS NOT OPERATING FOCUS CHARACTER (= THE PLAYER IS NOT TOUCHING THE TOUCH PANEL) | ONE |
| 258 | INTERSECTION FLAG | ONE INTERSECTION HAS ALREADY OCCURRED | NO INTERSECTION YET | ONE |

INPUTTED TRACK

0 DEGREE

INPUTTED TRACK

15 DEGREES

INPUTTED TRACK

80 DEGREES

STORAGE MEDIUM HAVING STORED THEREIN GAME PROGRAM AND GAME DEVICE

BACKGROUND OF THE INVENTION

1. Field of the Invention

The present invention relates to an operation process for a game, and more particularly to an operation process for a game by using a pointing device as an input device.

2. Description of the Background Art

Conventionally, there has been proposed for a game device which allows a player to enjoy a game by controlling an input device other than a controller that comprise a cross key and a button. For example, there already is a game device which allows a player to input a hand-drawn figure via a touch panel, and then, based on a recognition result of the inputted figure a game is proceeded (for example, Japanese Laid-Open Patent Publication No. 2000-245960).

Also, for a simulation game, or the like, there is a technique to, after a character has been selected by a player to move to a position on a screen, release the character from a state of being selected, in response to whether or not a predetermined button, such as a cancel button, is pressed.

These days, however, the majority of game devices have a controller having a large number of buttons. Therefore, unless an operation manual for a game device is read by a player thoroughly, there may be a number of cases where the player is unable to tell which button is for releasing what has been selected. Further, there is a problem in which a player, even after having read an operation manual, forgets which button is for releasing what has been selected while playing a game, or presses a wrong button. Due to the aforementioned problem a player is not provided with a comfortable operational environment.

SUMMARY OF THE INVENTION

Therefore, an object of the present invention is to provide a storage medium stored therein a game program and a game device, which allow a player to release with an intuitive operation the state of an object being selected on a screen.

The present invention has the following features to attain the object mentioned above.

A first aspect of the present invention is directed to a game program which is executed by a processor of a game device having a display screen (for example, a second LCD 12) and a pointing device (15). The game program comprises: a related selected area setting step (for example, step S5; hereinafter, only a step number is to be indicated); a coordinates detection step (S2); an intersection determination step (S55); and a selected state release step (S60). The display screen displays a game image. The pointing device is an input device which is provided with regards to the display screen. In the related selected area setting step, when a given object group or a given area on the display screen is selected by a player, the computer sets the selected object group or the selected area as a related selected area. In the coordinates detection step, the computer, based on a signal outputted from the pointing device, successively stores in a unit of a time interval a coordinates value, which is inputted by the pointing device and indicates a position on the display screen. In the intersection determination step, the computer determines, based on a group of coordinates values stored in storage, whether or not the inputted track inputted by the player is the track intersecting the related selected area. In the selected state release step, the computer releases, when it is determined in the intersection determination step that a track of the inputted coordinates inputted by the player intersects the related selected area, the selected state of the related selected area.

A second aspect of the present invention according to the first aspect causes the computer to further execute a selected area display step (S12) and a selected area display erase step (S61). When a related selected area is set in a selected area setting step, the computer executes, in the selected area display step, a selected area display indicating that a given area on a screen set as the related selected area is the related selected area. In the selected area display erase step, the computer erases the selected area display when the selected state of the related selected area is released in the selected state release step.

A third aspect of the present invention according to the first aspect causes the computer to further execute an outline data acquisition step in which outline data, which indicates on the display screen coordinates corresponding to an outline part of the related selected area, is acquired. Further, in the intersection determination step, based on the group of coordinates values stored in storage in the coordinates detection step, or based on an outline data, the computer determines whether or not an inputted track inputted by a player is a track that intersects the outline. Further, in the selected state release step, when it is determined in the intersection determination step that the track of the inputted coordinates inputted by the player is a track that intersects the outline, the computer releases the selected state of the related selected area.

A fourth aspect of the present invention according to the third aspect causes the computer to further execute a vector data calculation step, an input start position determination step and a crossing determination step. In the vector data calculation step, the computer calculates, based on the group of coordinates values stored in storage, a plurality of pieces of vector data, which indicate the distance between and the direction of each successive coordinates value. In the input start position determination step, the computer determines whether or not a first set of input coordinates is outside the related selected area. In the crossing determination step, the computer determines whether or not there are at least two pieces of vector data, among the plurality of pieces of vector data, intersecting the outline. Also, the selected state release step releases the selected state of the related selected area when the computer determines in the intersection determination step that there are at least two pieces of vector data intersecting the outline.

A fifth aspect of the present invention according to the fourth aspect causes, in the selected state release step, the computer device to release the selected state of the related selected area when an angle, which is derived between a first and a second intersecting vector data among the plurality of pieces of vector data, is smaller than a predetermined degree.

A sixth aspect of the present invention according to the first aspect is characterized in that the related selected area and the selected object group each possess an area which overlaps each other.

A seventh aspect of the present invention according to the first aspect is characterized in that the related selected area is an area which encompasses the selected object group.

An eighth aspect of the present invention according to the first aspect is characterized in that the selected state release step includes a step in which it is determined whether or not the selected state of the related selected area is to be released depending on the size ratio between two divided areas created by a track that intersects the related selected area.

A ninth aspect of the present invention according to the first aspect is characterized in that the selected state release step includes a step in which it is determined whether or not the selected state of the related selected area is to be released depending on the ratio of object included in each of two divided areas which are created by the track intersecting the related selected area.

A tenth aspect of the present invention according to the first aspect is characterized in that the selected area setting step includes a step in which the area which encompasses an object selected by the player as the operation object is set as the related selected area.

An eleventh aspect of the present invention according to the first aspect is characterized in that the selected area setting step includes a step in which a figure, which is created by connecting each object of the selected object group, is set as the related selected area.

A twelfth aspect of the present invention is a game device having a display screen, a pointing device, a storage, a selected area setting section, a coordinates detection section and a selected state release section. The display screen displays a game image. The pointing device is provided in relation to the display screen. The selected area setting section sets, when a given object group or a given area on a display screen is selected by a player, the object group or the area on the screen as a related selected area. The coordinates detection step calculates and successively stores, based on a signal outputted from the pointing device, a coordinates value which indicates on a display screen a position inputted with the aid of the pointing device. The intersection determination section determines, based on a group of coordinates values stored in storage by the coordinates detection section, whether or not an inputted track inputted by a player is a track that intersects a related selected area. The selected state release section releases a selected state of the related selected area when the intersection determination section determines that a track of the inputted coordinates inputted by the player intersects a related selected area.

According to the first aspect mentioned above, by inputting a track which intersects a related selected area, a selected state of the related selected area can be released. That is, as a player performs an intuitive "cutting-like" operation through the related selected area, the selected state thereof is released. Therefore, the present invention can allow a player to operate with an intuition-based feel, thus operability is improved.

According to the second aspect mentioned above, the related selected area is displayed somewhere on a screen. Therefore, the present invention can provide the player with an easy position on the screen for performing an operation to release a selected state of the related selected area, thus operability is improved.

According to the third aspect mentioned above, if a track intersecting an outline of the related selected area is inputted with the aid of a pointing device, the selected state of the related selected area is released. Therefore, a "cutting-like" operation performed at an end of a related selected area releases the selected state, which has an effect of improving operability.

According to the fourth aspect mentioned above, unless a starting point of the track intersecting the related selected area is outside the area, the selected state of the related selected area is not released. Therefore, the present invention can allow a player to feel as if he/she is intuitively "cutting" a related selected area in order to perform a selected state release operation. Further, unless an inputted track intersects an outline of a related selected area twice, a selected state release is not executed. Therefore, the present invention can obviate, for example, unintentional selected state release operation in which a selected state is released when a player draws, with an intention of performing a transfer operation for a related selected area, an inputted track which intersects an outline of a related selected area from inside thereof to outside. This allows the present invention to provide a player with a further improved operability.

According to the fifth aspect mentioned above, it is possible to add a condition for an inputted track which is used for releasing a selected state. Particularly, by having a condition which states that an angle made by a first and a second intersections needs to be smaller than a predetermined degree, a selected state is released only when an inputted track is drawn like a straight line. By this, the present invention can allow a player to feel as if he/she is "cutting" a related selected area in order to release the selected state thereof, and also obviate unintentional selected state release operation.

According to the sixth and the seventh aspects mentioned above, a player can select an object group of his/her choosing by performing an intuitive operation, thus operability is improved.

According to the eighth and the ninth aspects mentioned above, the present invention can cause a player to intuitively understand an act of "cutting," which is performed in order to release a selected state. By this, releasing of a selected state by a wrong operation is obviated.

According to the tenth and the eleventh aspects mentioned above, a player can intuitively release a selected state of an object which is operated by the player.

Also, according to a game device of the present invention, a same effect as a game program of the aforementioned present invention can be attained.

These and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a chart summarizing each flag used for the present embodiment;

DESCRIPTION OF THE PREFERRED EMBODIMENTS

A configuration and a movement of a game device according to a first embodiment of the present invention will be described below.

Figure 1:
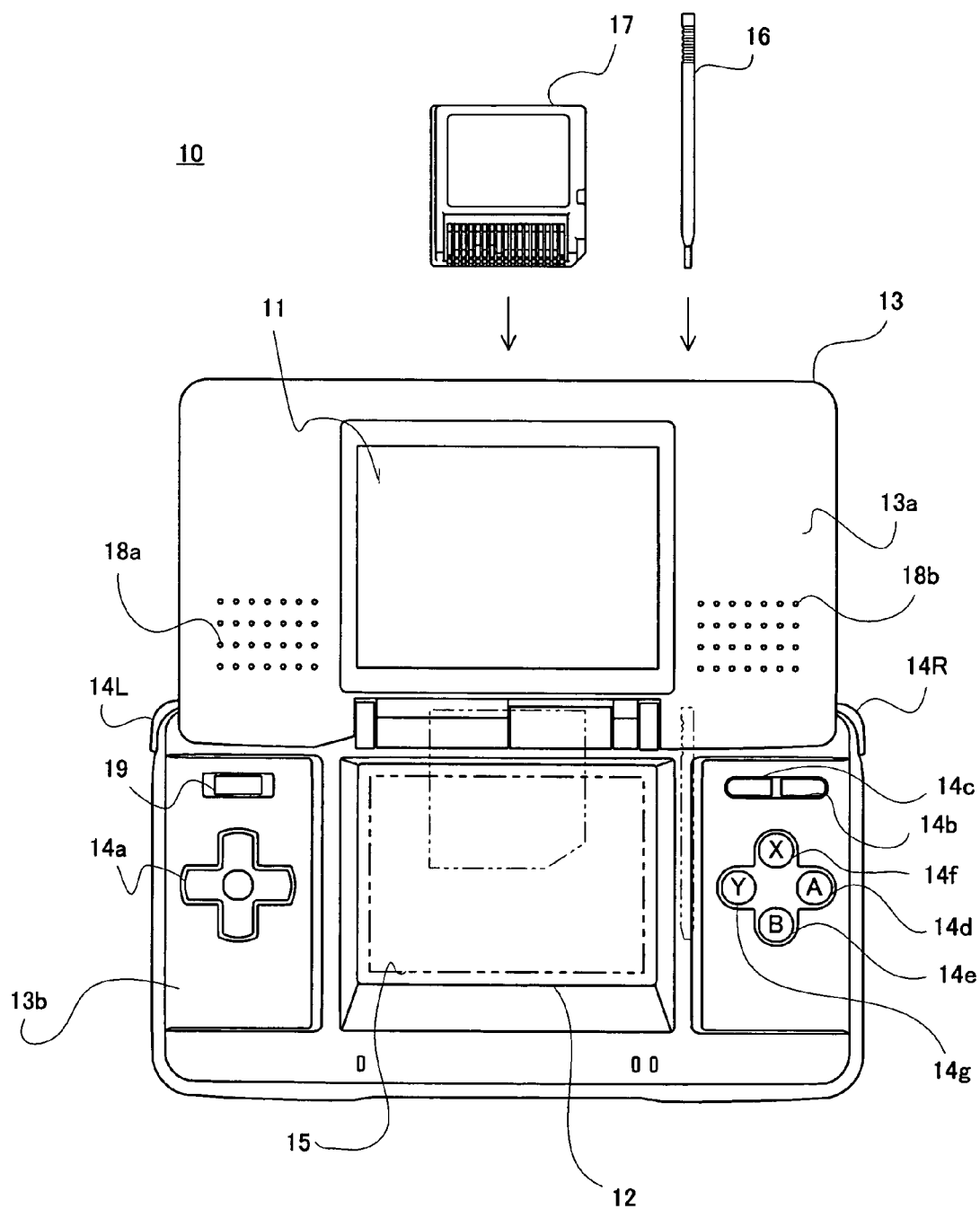
FIG. 1 is an external view of a game device according to a first embodiment of the present invention.

FIG. 1 is an external view of a game device according to a first embodiment of the present invention. In FIG. 1, a game device 10 includes a first LCD (Liquid Crystal Display) 11 and a second LCD 12. A housing 13 comprises an upper housing 13a and a lower housing 13b, and the first LCD 11 is stored in the upper housing 13a, and the second LCD 12 is stored in the lower housing 13b. Resolutions of the first LCD 11 and the second LCD 12 are both 256 dots×192 dots. Note that though a LCD is used as a display device in the present embodiment, any other display devices such as a display device using an EL (Electro Luminescence) may be used. Also, the resolution of the display device may be at any level.

The upper housing 13a is provided with sound holes 18a and 18b for releasing a sound from a pair of loudspeakers (30a and 30b shown in FIG. 2) to an exterior. A description of the pair of loudspeakers will be provided later.

The lower housing 13b is provided with input devices as follows; a cross switch 14a, a start switch 14b, a select switch 14c, a "A" button 14d, a "B" button 14e, a "X" button 14f, a "Y" button 14g, a "L" button 14L, and a "R" button 14R. In addition, a touch panel 15 is provided on a screen of the second LCD 12 as another input device. The lower housing 13b further includes a power switch 19, and insertion openings for storing a memory card 17 and a stick 16.

The touch panel 15 may be of any type such as a resistive film type, an optical type (infrared type), or a capacitive coupling type. The touch panel 15 has a function of outputting, when its surface is touched with the stick 16, coordinates data which corresponds to a touch position. Though the following description is provided on an assumption that the player uses a stick 16 to operate the touch panel 15, of course the touch panel 15 may also be operated by a pen (stylus pen) or a finger instead of the stick 16. In the present embodiment, a touch panel 15 having a resolution at 256 dots×192 dots (detection accuracy) as same as the second LCD 12 is used. However, resolutions of the touch panel 15 and the second LCD 12 may not necessarily be consistent with each other.

The memory card 17 is a storage medium having a game program stored therein, and placed in the insertion slot provided at the lower housing 13b in a removable manner.

Next, an internal setting of the game device 10 will be described with reference to FIG. 2.

Figure 2:
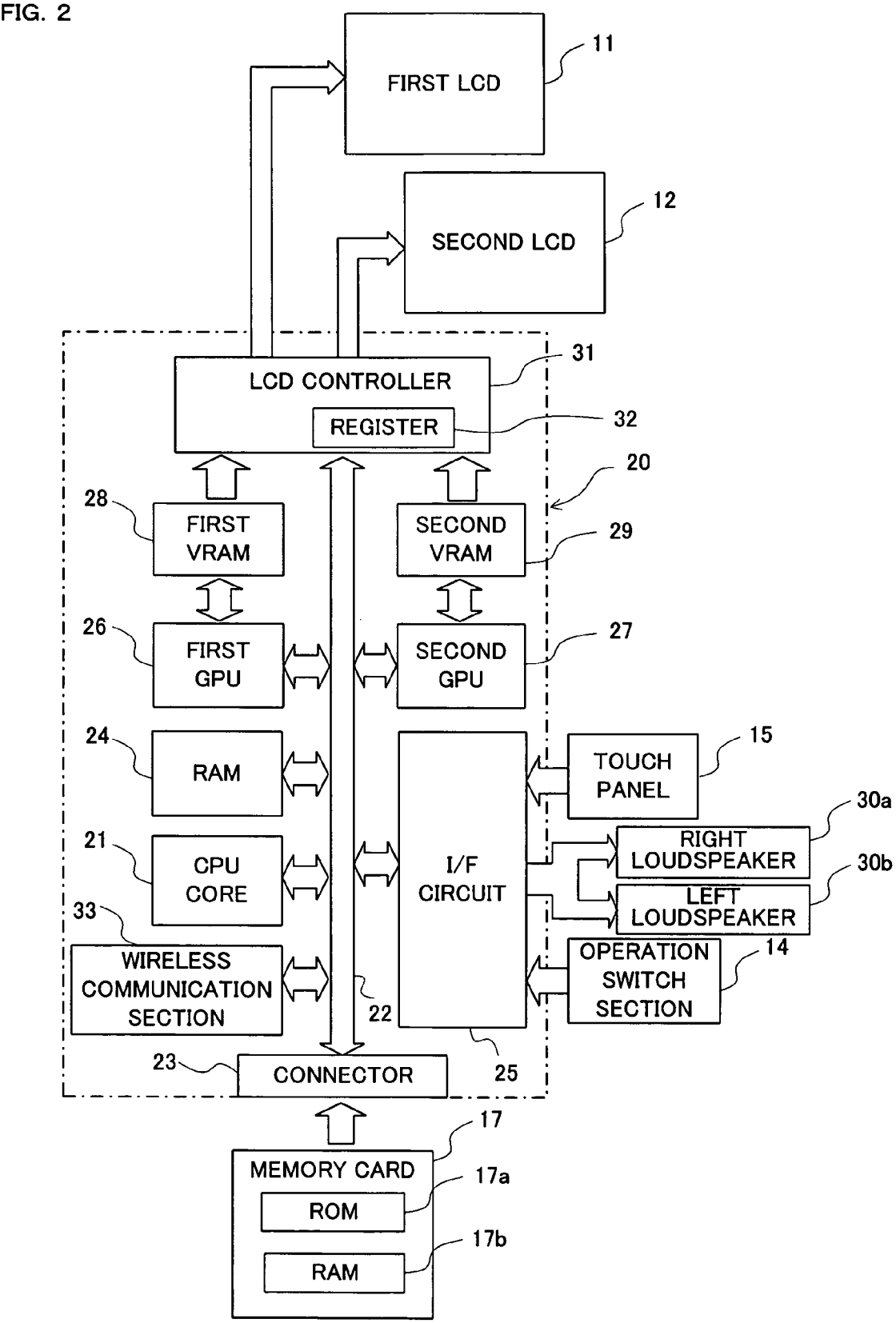
FIG. 2 is a diagram illustrating an internal configuration of a game device.

In FIG. 2, a CPU core 21 is mounted on an electronic circuit board 20 which is to be housed in the housing 13. Via a bus 22, the CPU core 21 is connected to a connector 23, an input/output interface circuit (shown as I/F circuit in the diagram) 25, a first GPU (Graphics Processing Unit) 26, a second GPU 27, a RAM 24, a LCD controller 31 and a wireless communication section 33. The memory card 17 is connected to the connector 23 in a removable manner. The memory card 17 includes a ROM 17a for storing a game program and a RAM 17b for storing backup data in a rewritable manner. The game program stored in the ROM 17a of the memory card 17 is loaded to the RAM 24, and the game program having been loaded to the RAM 24 is executed by the CPU core 21. The RAM 24 stores, in addition to the game program, data such as temporary data which is obtained by the CPU core 21 executing the game program, and data for generating a game image. To the I/F circuit 25 are connected, a touch panel 15, a right loudspeaker 30a, a left loudspeaker 30b and an operation switch section 14, which is comprised of a cross switch 14a, a "A" button 14d, and others, as shown in FIG. 1. The right loudspeaker 30a and the left loudspeaker 30b are arranged inside the sound holes 18a and 18b, respectively.

A first VRAM (Video RAM) 28 is connected to the first GPU 26, and a second VRAM 29 is connected to the second GPU 27. In accordance with an instruction from the CPU core 21, the first GPU 26 generates a first game image based on data used for image generation which is stored in the RAM 24, and writes images into the first VRAM 28. The second GPU 27 also follows an instruction from the CPU core 21 to generate a second game image, and writes images into the second VRAM 29. The first VRAM 28 and the second VRAM 29 are connected to the LCD controller 31.

The LCD controller 31 includes a register 32. The register 32 stores a value of either 0 or 1 in accordance with an instruction from the CPU core 21. When the value of the register 32 is 0, the LCD controller 31 outputs to the first LCD 11 the first game image which has been written into the first VRAM 28, and outputs to the second LCD 12 the second game image which has been written into the second VRAM 29. When the value of the register 32 is 1, the first game image which has been written into the first VRAM 28 is outputted to the LCD 12, and the second game image which has been written into the second VRAM 29 is outputted to the first LCD 11.

The wireless communication section 33 has a function of exchanging data, which is used for a game process, and other data between the wireless communication section 33 and other game device. One example for the function provides a wireless communication function, which is in accordance with wireless LAN standards IEEE802.11. The wireless communication section 33 outputs to the CPU core 21 received data. Also, the wireless communication section 33 transmits to other game devices data which has been instructed by the CPU core 21. Note that by mounting a protocol, such as TCP/IP (Transmission Control Protocol/Internet Protocol), or a predetermined browser on the wireless communication section 33 or a storage section inside the game device 10, the game device 10 is enabled to connect to a network such as the Internet via the wireless communication section 33. Further, the game device 1 can inspect documents and images which are made public on the Internet on the first LCD 11 and the second LCD 12.

Further, the configuration of the game device 10 as mentioned above is a merely an example. The present invention is applicable to any computer system which comprises a pointing device (touch panel, mouse, touch pad, etc) and at least one display device. Also, the game program of the present invention can be supplied to a computer system not only by the way of an external storage medium such as a memory card 17, but also by the way of a wired or wireless communication line. The game program can also be recorded beforehand in a nonvolatile storage inside a computer system.

Figure 3:
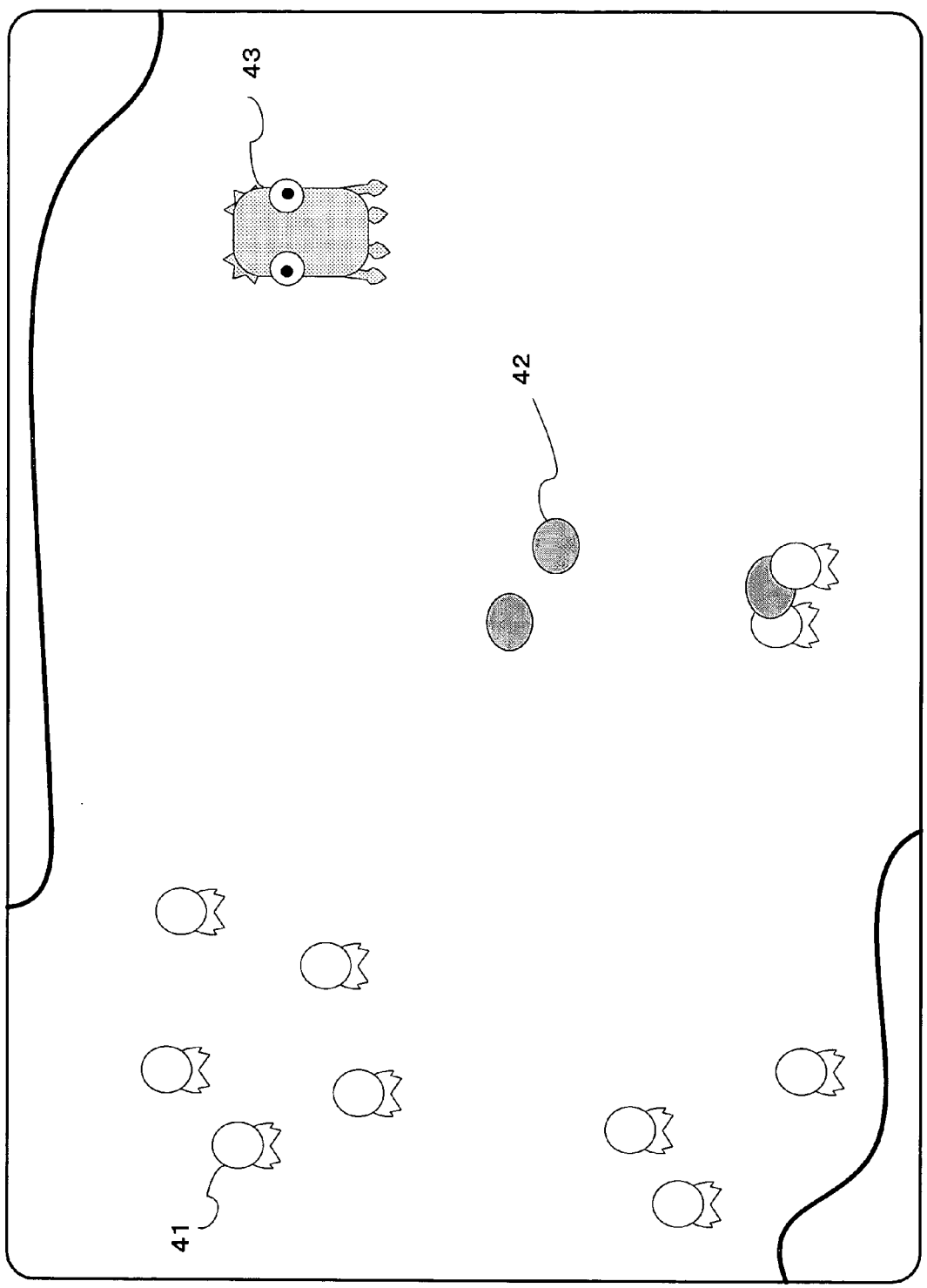
FIG. 3 is an example of an exemplary display of a game according to the present embodiment.
Figure 4:
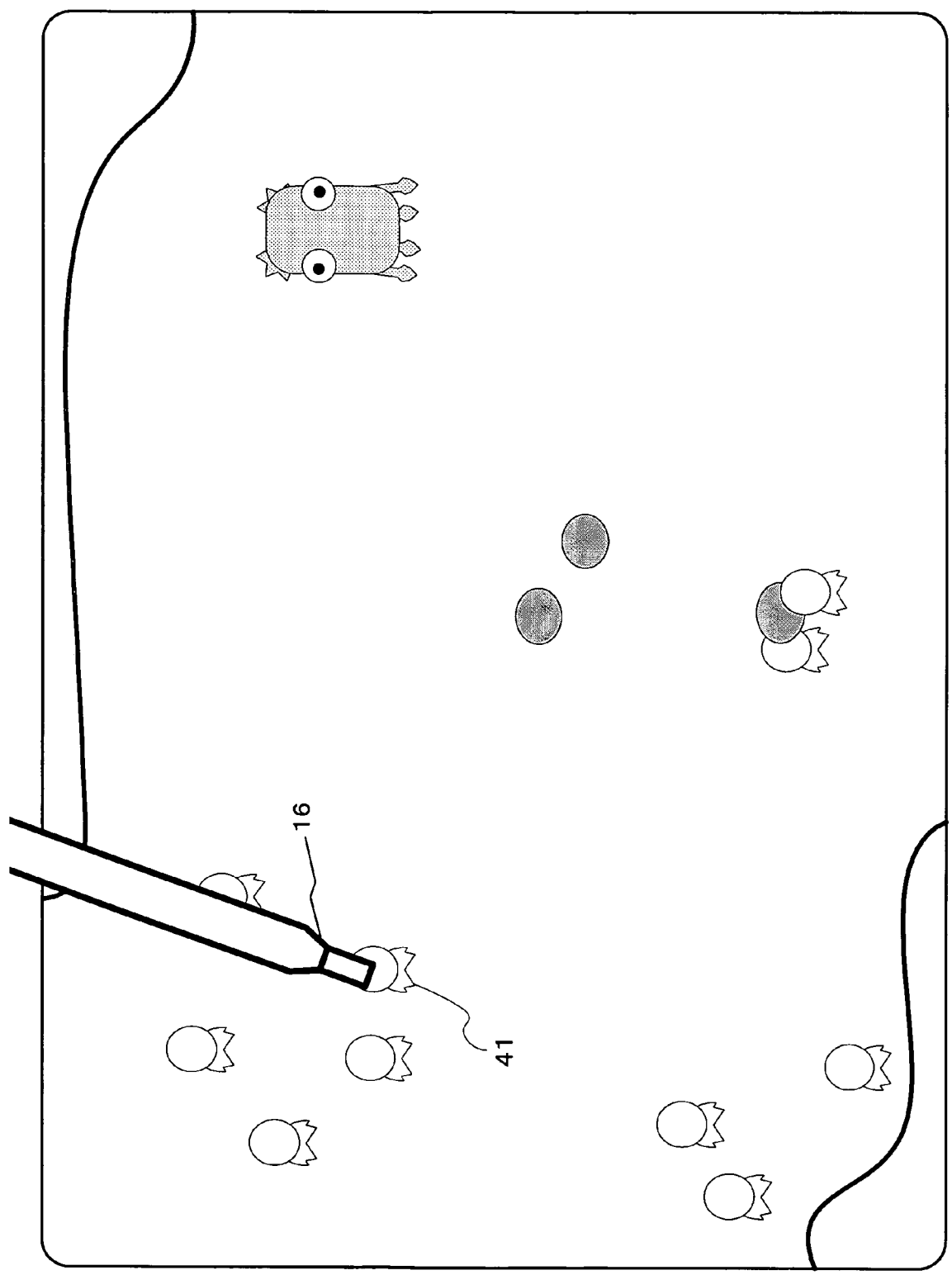
FIG. 4 is a diagram illustrating a single player character being selected.
Figure 5:
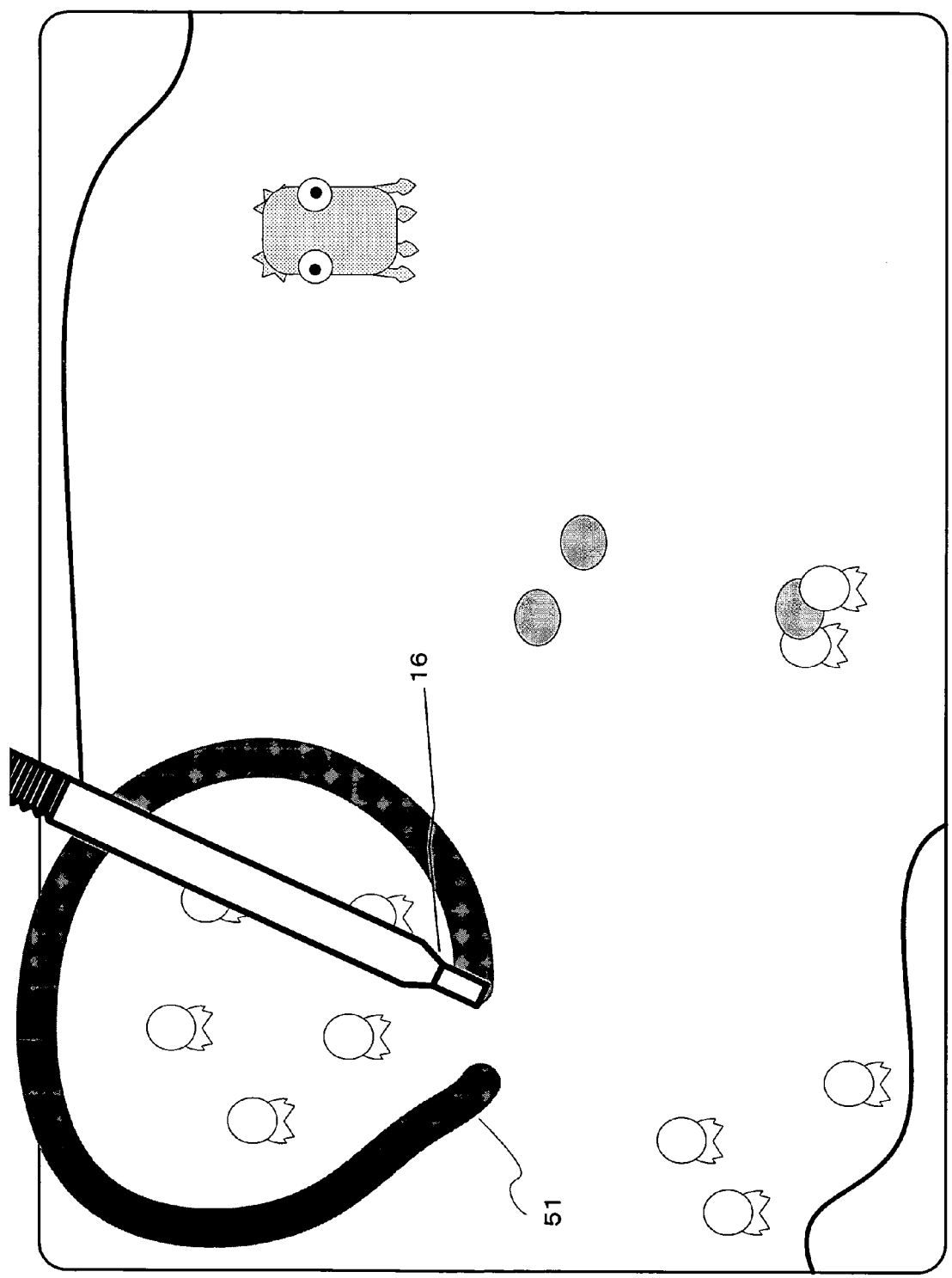
FIG. 5 is a diagram illustrating a plurality of player characters being selected.
Figure 6:
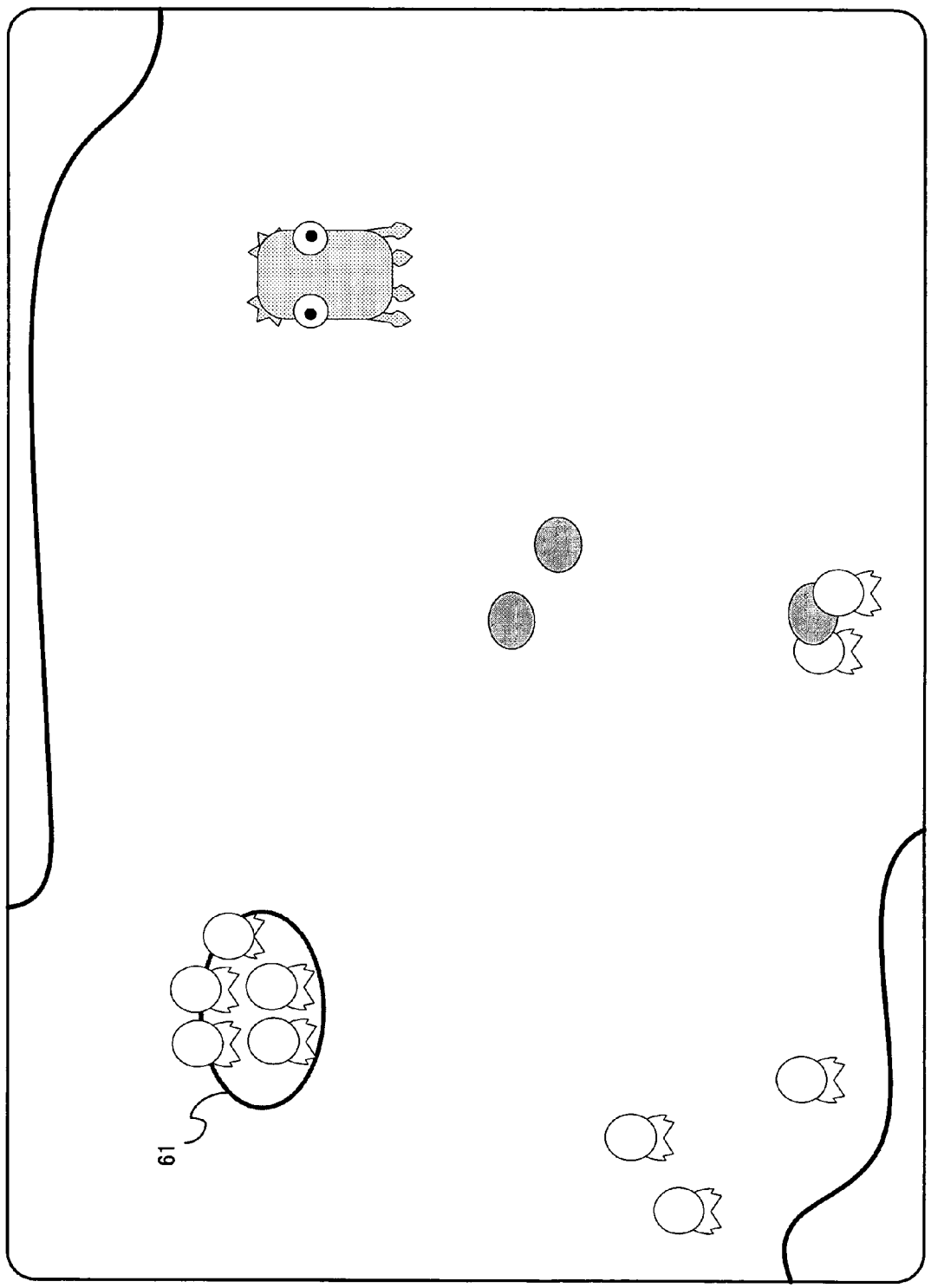
FIG. 6 is a diagram illustrating a plurality of groups comprised of a player character.
Figure 7:
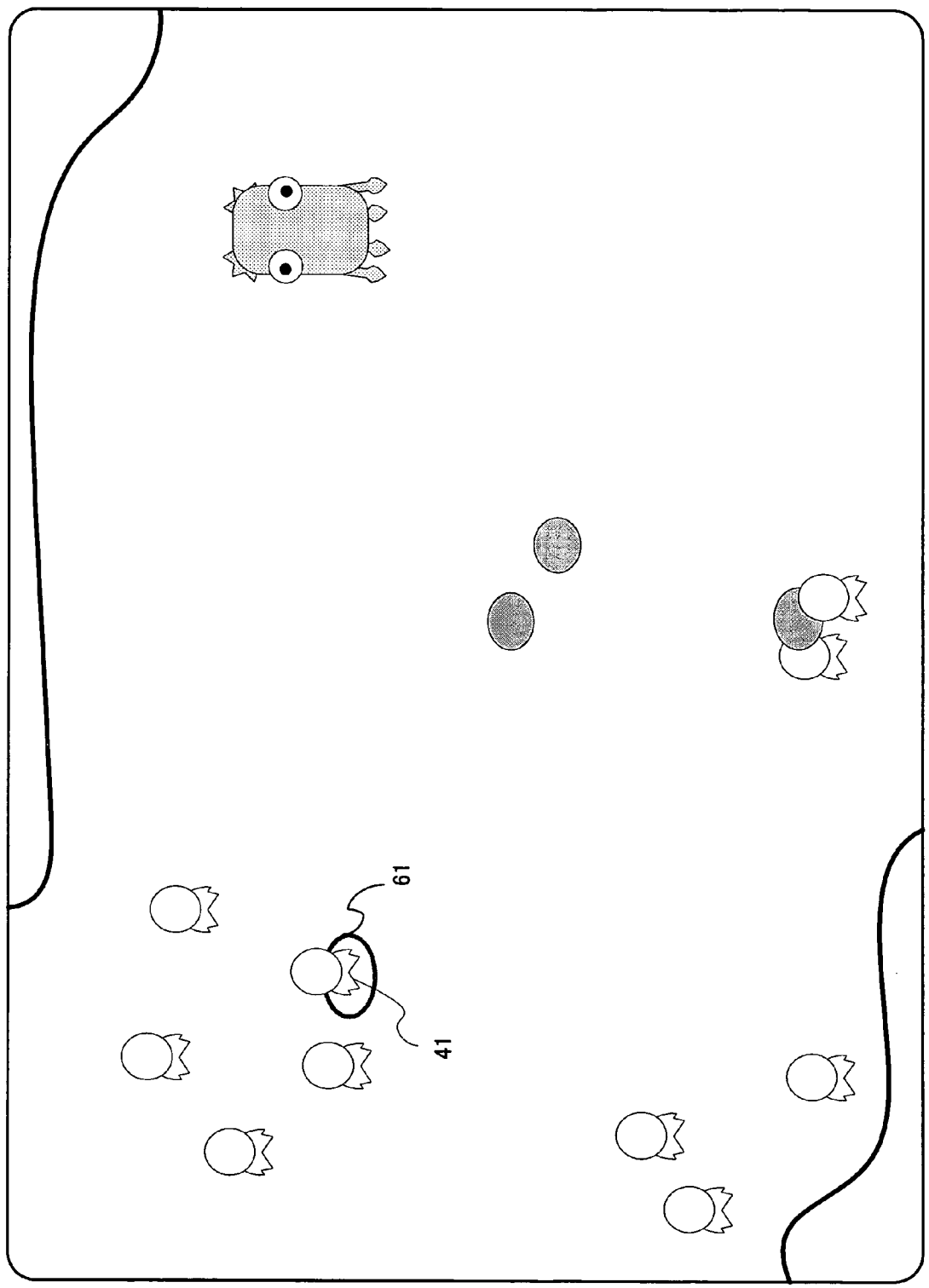
FIG. 7 is a diagram illustrating a single group comprised of one player character.
Figure 8:
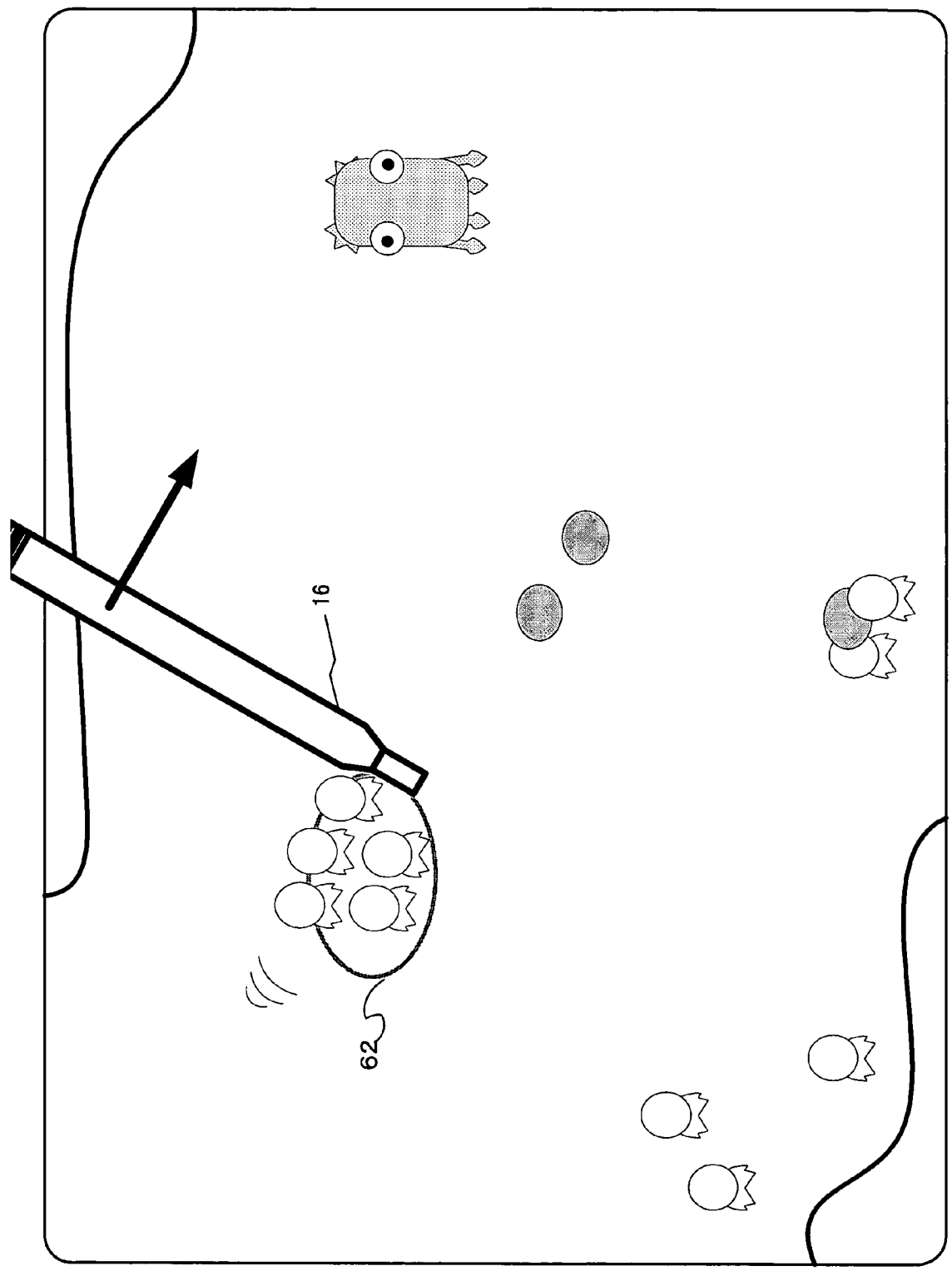
FIG. 8 is a diagram illustrating a state where the player characters are being relocated.
Figure 9:
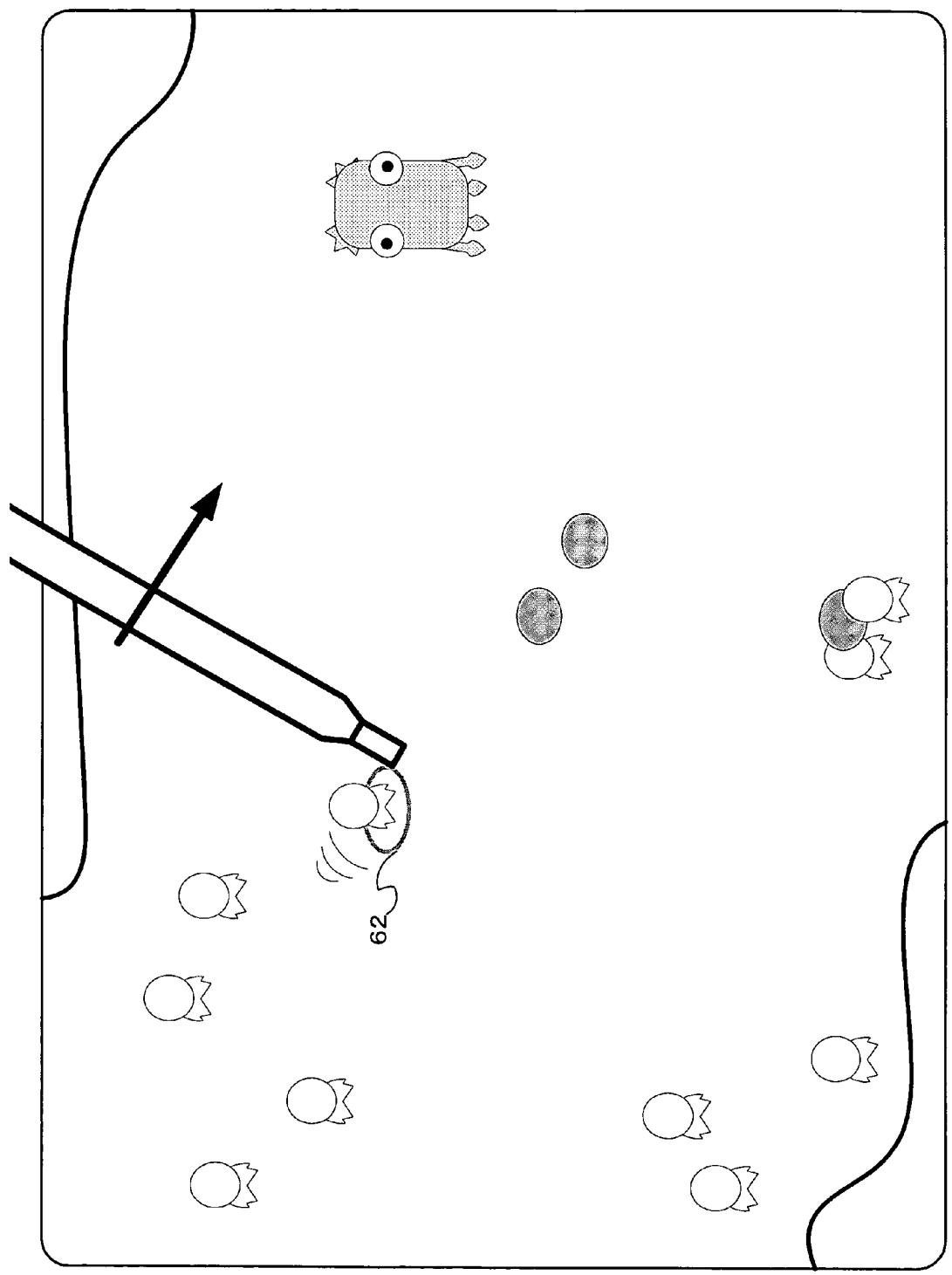
FIG. 9 is a diagram illustrating a state where a player character is being relocated.

Next, by using FIG. 3 through FIG. 12, a summary of a hypothetical game in the present embodiment will be described. FIG. 3 is an example of a game display as hypothesized in the present embodiment. In the present game, player characters 41 are scattered across a screen. Initially, each player character 41 acts accordingly with a movement program thereof. In the initial state, a player performs an operation to select, as an operation object, any of the player characters 41 among the player characters 41 that are scattered across the screen. There are two patterns for the selection operation: a pattern in which a single player character 41 is selected; and a pattern in which a plurality of player characters 41 are selected. To select a single player character 41, the player performs an operation of pointing with a stick 16 (or a finger) at a player character 41 which the player wishes to select, and removing the stick 16 from the player character as illustrated in FIG. 4. On the other hand, to select a plurality of player characters 41, a player performs an operation of circling with the stick 16 around player characters 41 which the player wishes to select. To be more specific, the player performs an operation of moving a stick 16 over a touch panel 15 while the stick 16 is in constant contact with the touch panel 15 as illustrated in FIG. 5. During this operation, the player performs an operation with the stick 16 and a track thereof circling any of the player characters 41. The track indicates that an input is executed by the player over the touch panel 15, and hereinafter, is referred to as an inputted track. Once a plurality of player characters are circled, the player characters group together, preferably, in one position so as to form a group of the player characters. During this, the group of player characters is indicated in a state in which the group is surrounded by a red circle 61 (hereinafter referred to as a standby-to-be-instructed-circle) as illustrated in FIG. 6. Hereinafter, the state is referred to as ready-to-be-instructed-state. Above also applies in a case where a single player character 41 is selected. That is, when the single player character 41 is selected, a group comprised of a single player character 41 is formed as illustrated in FIG. 7. When a player touches a group which is in the ready-to-be-instructed-state, the standby-to-be-instructed-circle 61, which is mentioned above, turns into a yellow circle 62 (hereinafter referred to as an operation circle) until the player lifts a stick 16 off the touch panel 15. This indicates that the group is in-operation to be moved. At the same time, this indicates that the player is touching the touch panel 15. Hereinafter, a state in which the operation circle 62 is indicated is referred to as an in-operation state. Also, when the player moves a stick 16 while the stick 16 is touching the touch panel 15 in the in-operation state, each player character starts to move at its own speed toward a contact position of the stick 16 (to be more precise, a contact position of the stick 16 corresponding to a point in the game world) as the destination. As described above, a player can move the group as though he/she is dragging it as illustrated in FIG. 8 and FIG. 9. Also, the player moves the group to various places over a screen and causes a group of player characters, which forms the group, to perform various actions (hereinafter, referred to as "job"). The job includes, for example, attacking an enemy character 43, transporting food 42 which comes falling to a base, and taking in player characters 41 which are yet to joint the group. The present game is a game that repeats the aforementioned processes to nurture the player characters 41 in the game world.

Also, in a game image, an inputted track display 51, which indicates an inputted track, is displayed (a wide line indicated in FIG. 5). The inputted track display 51 is displayed at a position on the display screen corresponding to a position in which an input is performed on the touch panel 15. That is, the inputted track display 51 is displayed as a player actually moves his/her own finger on the touch panel 15. In FIG. 5, it can be seen that an inputted track is almost a ring shape. Due to the inputted track 51, a player can recognize an inputted track of his/her input operation clearly and intuitively. Therefore, a player can recognize immediately whether a player character 41 or/and the like is circled properly, and whether or not a "cutting" operation, which will be described below, is properly executed. Also, an inputted track display 51 is erased automatically after a predetermined period of time.

Figure 10:
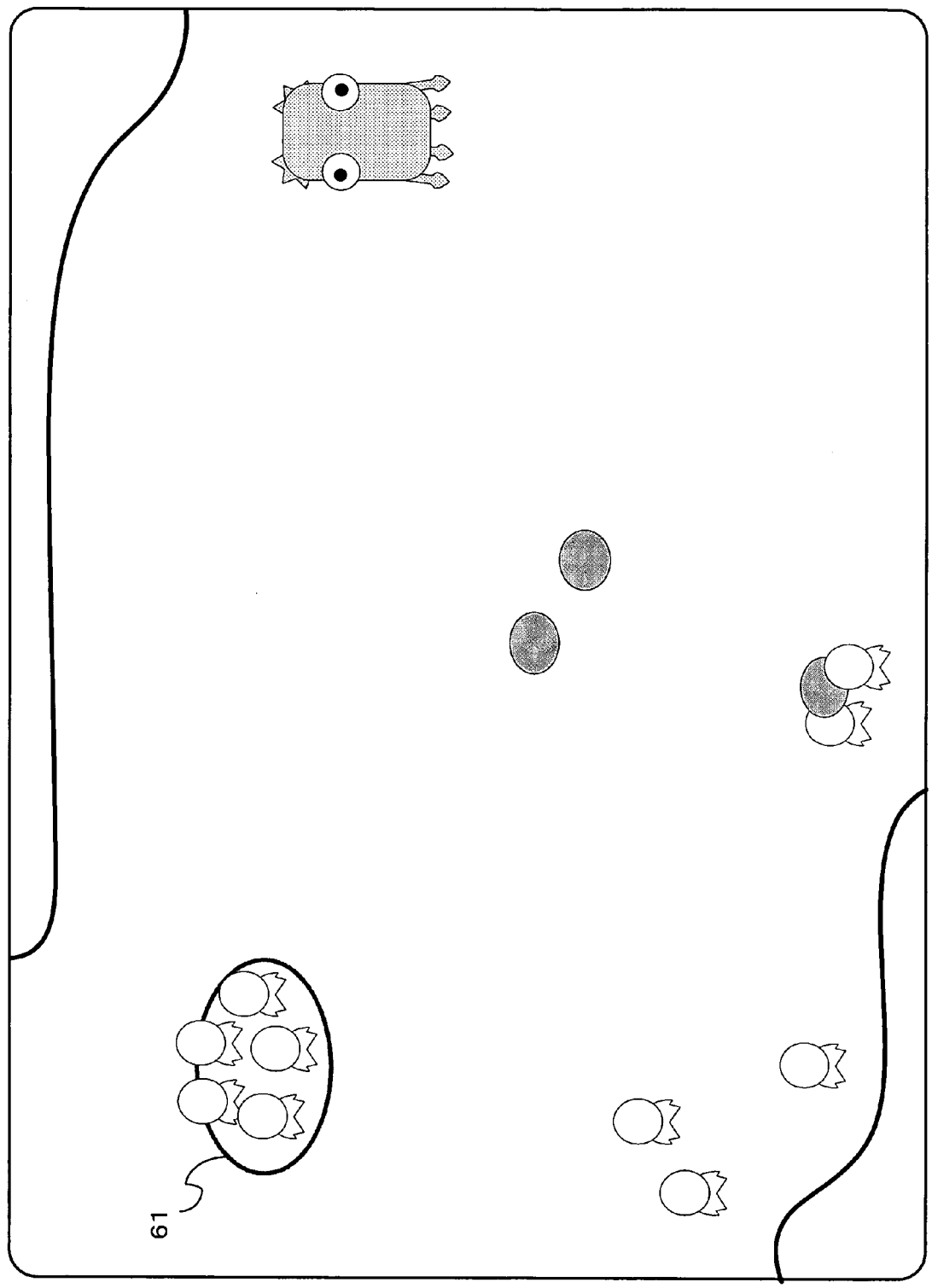
FIG. 10 is a diagram illustrating a state before a group is dispersed.
Figure 11:
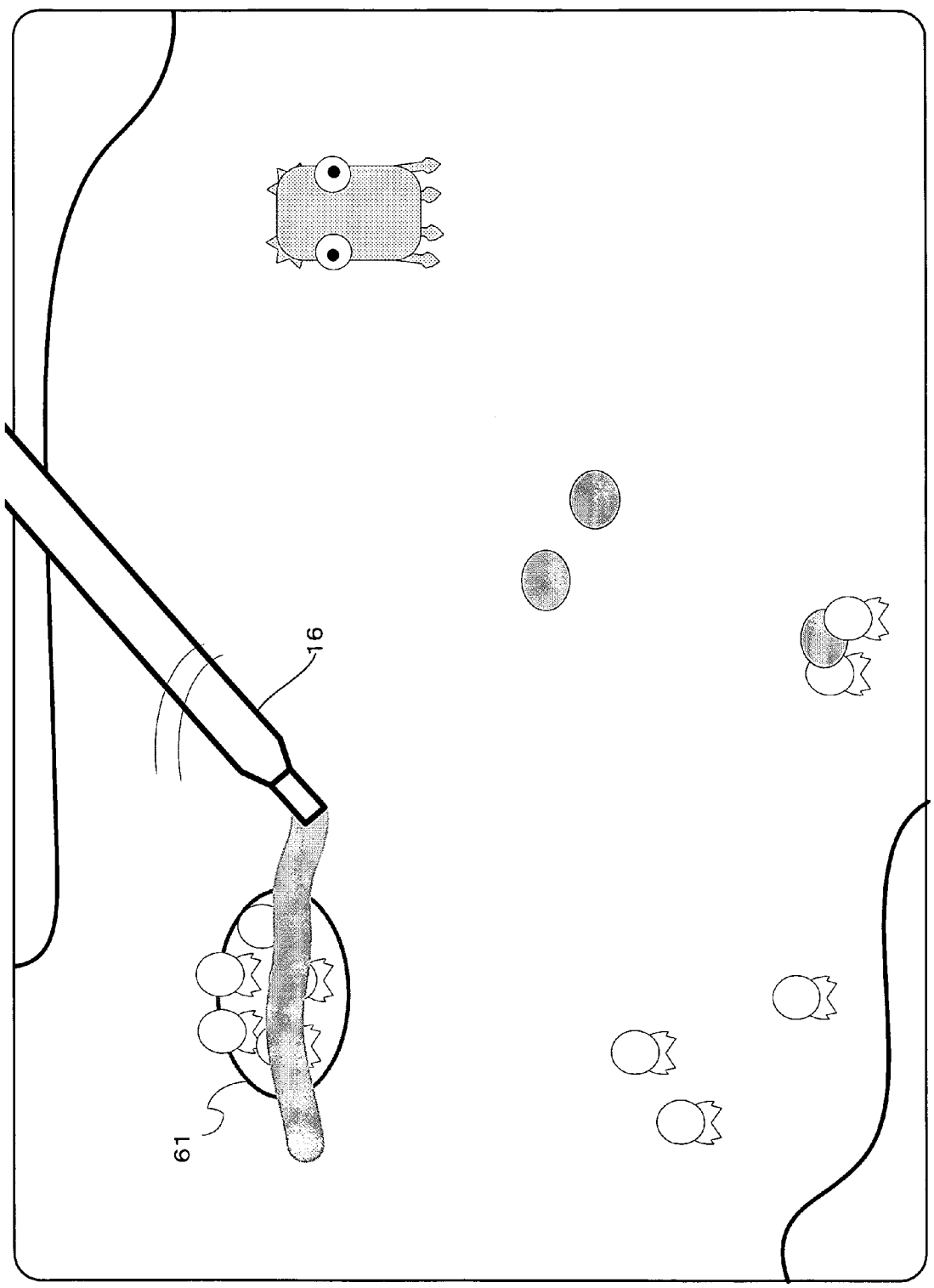
FIG. 11 is a diagram illustrating a state in an operation of dispersing a group.
Figure 12:
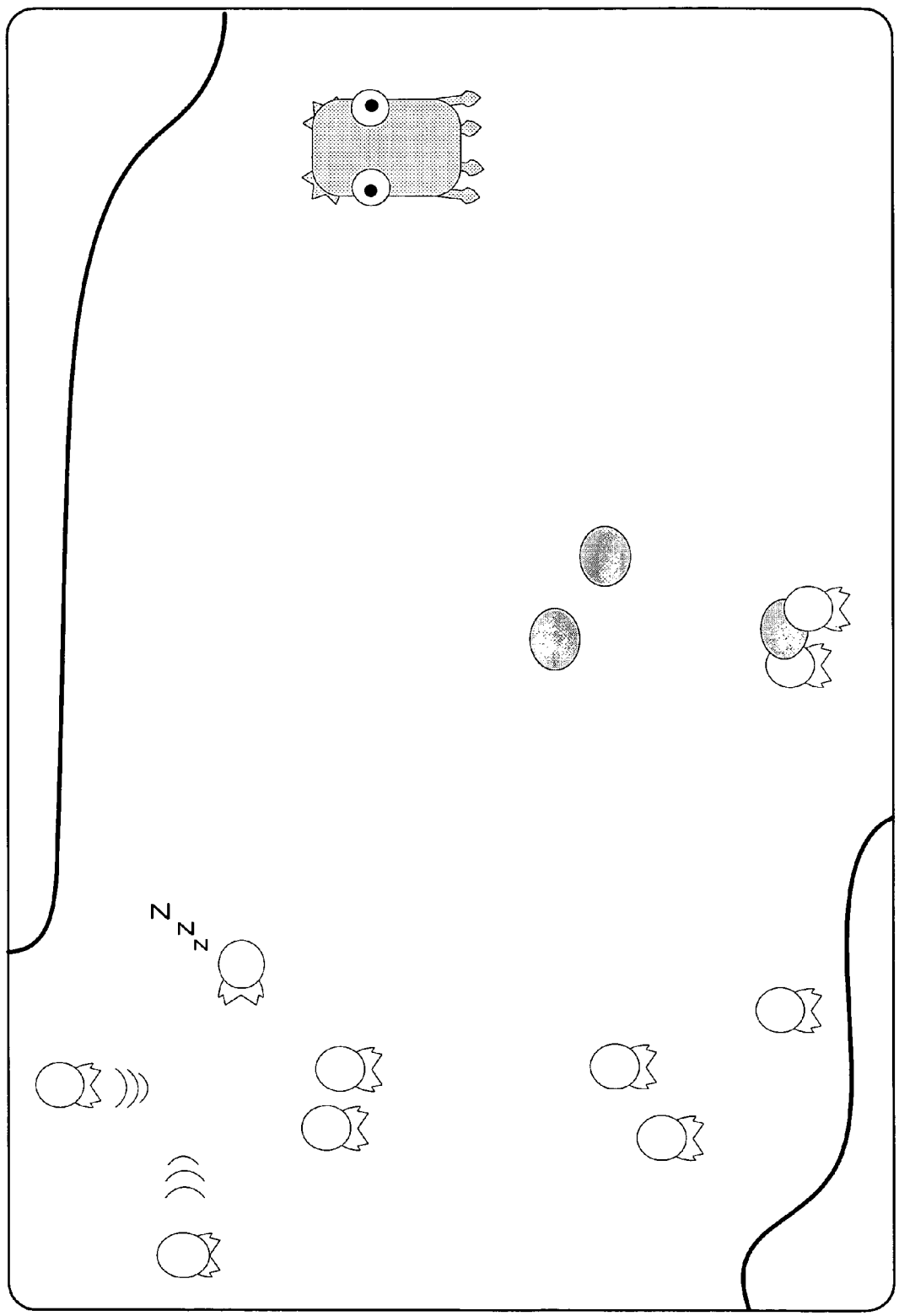
FIG. 12 is a diagram illustrating a state after a group is dispersed.

Also, according to the present embodiment, a player can release a group of a player character by performing a "cutting-like" operation over a standby-to-be-instructed-circle 61. This release operation will be described with reference to FIG. 10 through FIG. 12. FIG. 10 is a diagram illustrating a group in a state before being released. In the state, a player performs a drawing-like operation (namely, a cutting-like operation) to draw a horizontal line which intersects a standby-to-be-instructed-circle 61 as illustrated in FIG. 11. Then, the indication of the standby-to-be-instructed-circle 61 is erased, thereby releasing the group. As a result, as illustrated in FIG. 12, each player character 41 which is a part of the group will be free from an instruction of the player so as to begin a predetermined move (e.g., resting, moving to another position, and playing at the same position) of its own.

Figure 13:
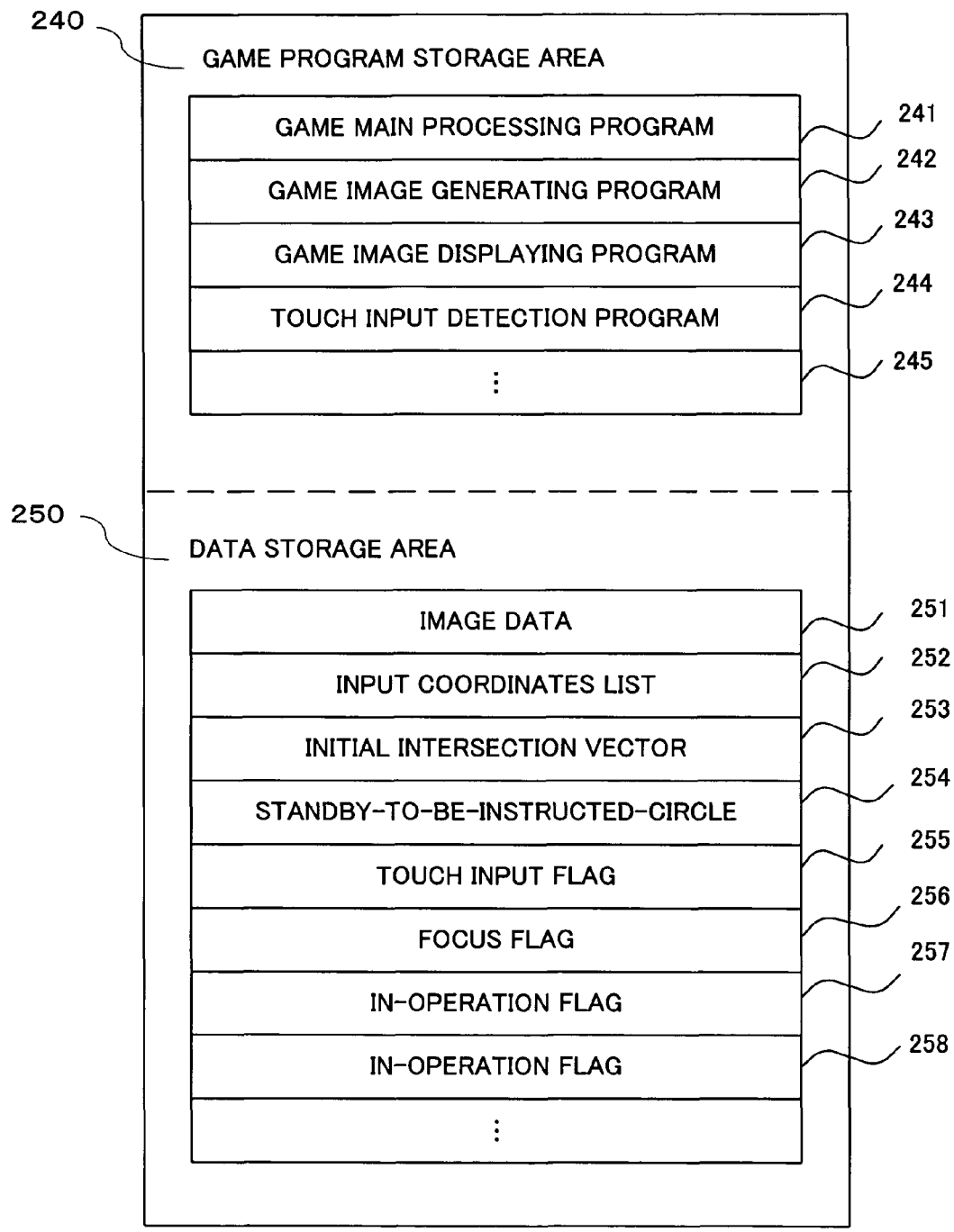
FIG. 13 is a diagram illustrating a memory map of RAM 24 indicated in FIG. 2.

Next, data which is to be stored in the RAM 24 during a game process will be described. FIG. 13 is a diagram for explaining a memory map of the RAM 24 which is illustrated in FIG. 2. In FIG. 13, the RAM 24 includes a game program storage area 240 and a data storage area 250. The game program storage area 240 stores a game program that is executed by a CPU core 21. The game program is comprised of a game main processing program 241, a game image generating program 242, a game image displaying program 243, a touch input detection program 244, and the like.

The game main processing program 241 is a program for processing main routines described above. The game image generating program 242 is a program for generating, by using an image data 251 which is described below, a game image such as a player character 41, an enemy character 43, a non-player character (excluding an enemy character) and a background object. The game image displaying program 243 is a program for displaying on LCD 11 and LCD 12 a game image generated by the game image generating program 242.

The touch input detection program 244, at intervals of a given period of time (in the present embodiment, 1 frame), detects whether or not a player performs a touch input, and sets an after mentioned touch input flag 255 as an established state (ON) or as an un-established state (OFF). Further, the touch input detection program 244 is a program for storing (temporarily) coordinates data corresponding to a detected touch input in the inputted coordinates list 252 in the order of input time. Here, whether or not there is any touch input is determined by whether or not coordinates data, corresponding to a detected touch input, is inputted through the touch panel 15.

Note that in the game program storage area 240, though not illustrated, a sound reproduction program and a backup program are also stored. The sound program is a program for reproducing essential sound for a game. Also, the backup program is a program for storing (saving) in the RAM 24 of the memory card 17 accordingly with a given timing (event) data (progress data of a game or a game result) which is generated as a game progresses.

In the data storage area 250, data, such as image data 251, an inputted coordinates list 252, an initial intersection vector 253, and standby-to-be-instructed-circle coordinates data 254 are stored. Also, flags, such as a touch input flag 255, a focus flag 256, an in-operation flag 257, and an intersection flag 258 are stored in the data storage area 250.

The image data 251 is data (e.g., polygon data and texture data) for generating a game image (a player character, a non-player character (including an enemy character), a back ground object, and a predetermined character).

Figure 14:
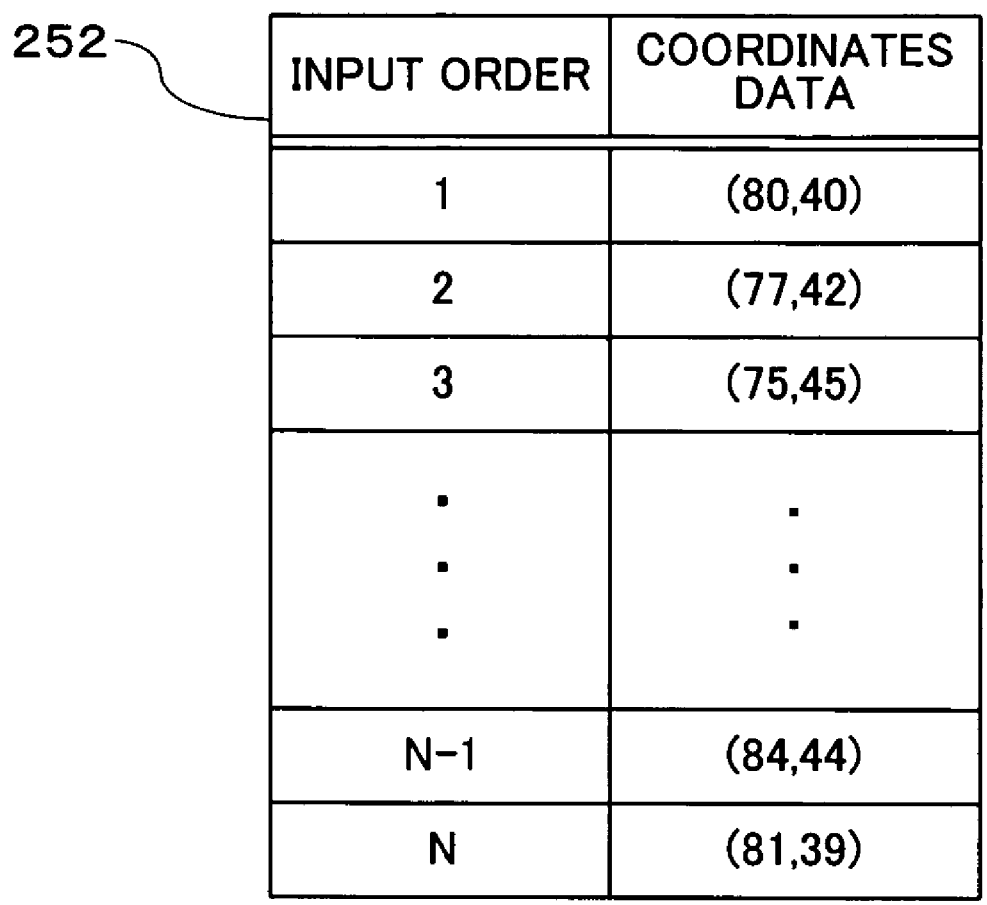
FIG. 14 is a diagram illustrating an example of an inputted coordinates list 252.

The inputted coordinates list 252 is a list of pairs each of an input order and the aforementioned coordinates data. In the present embodiment, coordinates data inputted by a player is to be detected at an interval of a predetermined time unit. The coordinates data is stored as a list in the RAM 24 as long as the player continuously performs an input (that is, a finger tip of the player has not been removed from the touch panel) as illustrated in FIG. 14.

The initial intersection vector 253, which is one piece of vector data among a plurality of pieces of vector data, and indicates a distance between and a direction of adjacent coordinates data, is stored in the inputted coordinates list 252. Also, the initial intersection vector 253 is a piece of vector data intersecting a standby-to-be-instructed-circle 61 for a first time (details of which will be described below). The initial intersection vector 253 is calculated from the inputted coordinates list 252.

The standby-to-be-instructed-circle coordinates data 254 is data indicating a group of coordinates values, and corresponds to positions on a screen where the standby-to-be-instructed-circle 61 is indicated.

The touch input flag 255 is a flag indicating a state of either ON or OFF of a touch input, and is changed between ON and OFF accordingly with the touch input detection program 244. Also, in the present embodiment, a touch input flag 255 is expressed in digital data of 1 bit, set as "1," when the touch input is ON, and set as "0" when the touch input is OFF. For each flag mentioned below, a same setting for ON and OFF is to be applied.

The focus flag 256 is a flag for indicating a character (that is, a character which is to be operated by the player), which a player selects from among a plurality of player characters 41 indicated on a screen. Therefore, the focus flag 256 is set for each player character. The flag is set as ON for a character once the character is selected by a player, and is set as OFF when the character is not selected. Also, a group of characters, for whom the flag is ON, is to form a group. That is, a character whose focus flag 256 is ON forms a group and is encompassed by a standby-to-be-instructed-circle 61.

The in-operation flag 257 is a flag for indicating whether or not any type of operation is being performed by using a stick 16 on a character (hereinafter, referred to as a focus character) whose focus flag 256 is ON. When the flag is ON, an operation circle 62 is to be displayed. When the flag is OFF, it indicates that the player is not performing an operation on a focus character.

The intersection flag 258 is a flag for indicating whether or not an inputted track inputted by a player intersects a standby-to-be-instructed-circle 61 once. When the flag is ON, it indicates that an inputted track inputted by the player has already intersected a standby-to-be-instructed-circle 61 once. When the flag is OFF, it indicates that an inputted track inputted by a player has not intersected a standby-to-be-instructed-circle 61.

FIG. 15 is a table summarizing the contents of each flag mentioned above. Also, though not illustrated, in the data storage area 250, a sound data for outputting essential sound for a game, data which is generated as the game progresses (progress data of a game and game result) and a flag (event flag) are stored.

Figure 16:
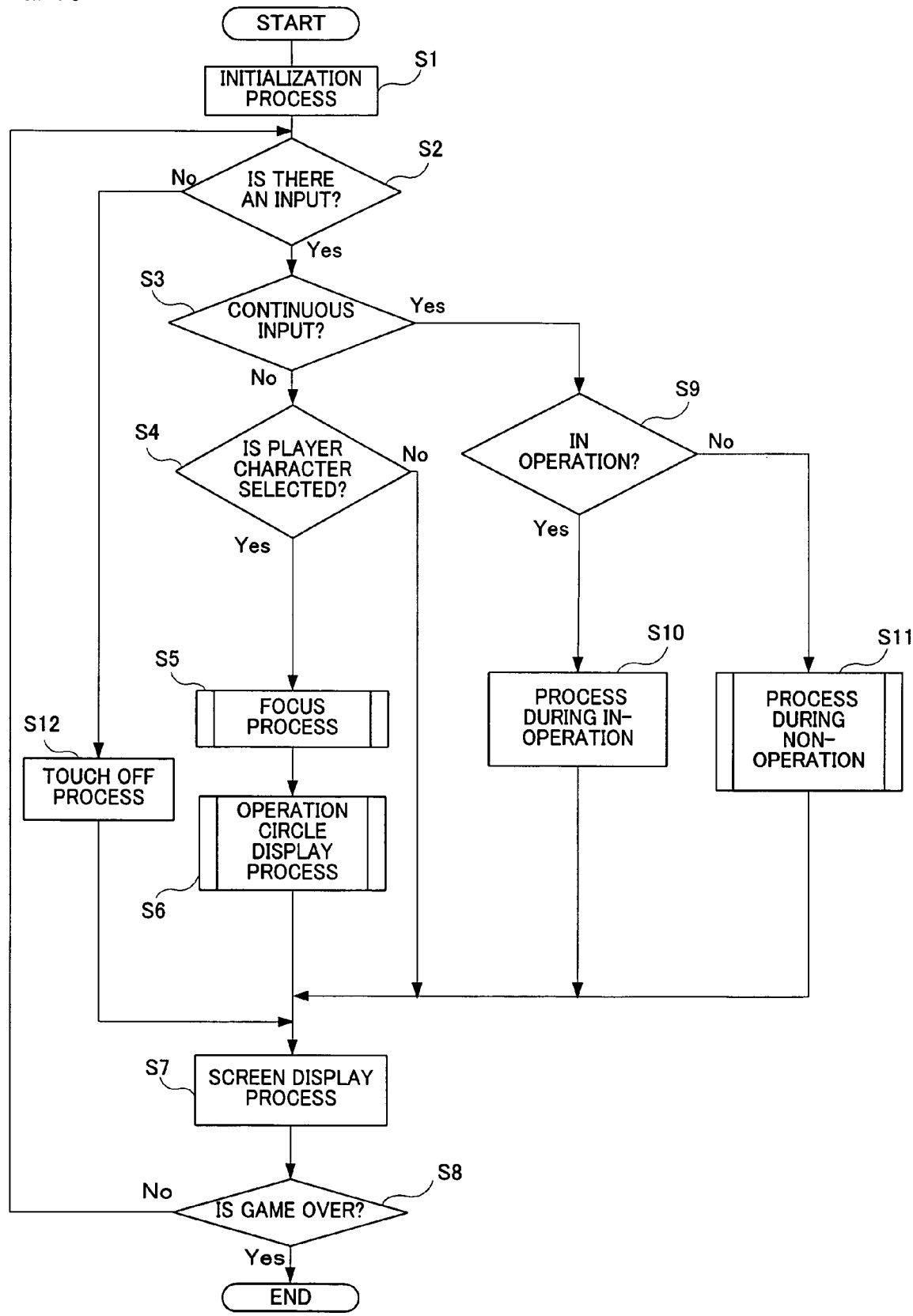
FIG. 16 is a flowchart illustrating game processes executed in a game device 10.

Next, by using FIG. 16 through FIG. 21, game processes executed in a game device 10 will be described. FIG. 16 is a flowchart illustrating game processes performed in a game device 10. When the power of a game device 10 is turned ON, the CPU core 21 of the game device 10 executes a start program stored in a boot ROM (not illustrated) to initialize each unit such as RAM 24. Then, a game program stored in a memory card 17 is read by the RAM 24, and the game program is begun to be executed. As a result, a game image is displayed via a first GPU 26 on a first LCD 11 to start a game (step S1).

Next, in step S2, a touch input is detected. That is, coordinates data inputted through a touch panel 15 is detected. As a result, when there is no touch input (NO in the step S2), a touch OFF process (step S11), which is described below, is executed. On the other hand, when there is a touch input (YES in the step S2), a touch input position is stored in an inputted coordinates list 252. That is, coordinates data inputted through the touch panel 15 is temporarily stored in the inputted coordinates list 252 in an order of input time. Then, in a step S3, a determination is made regarding whether or not a touch input flag is ON, that is, whether the touch panel is in a state (hereinafter, continuous input) of being touched continuously or in a state (hereinafter, new input) of being touched initially.

If it is determined in the step S3 that a new input (NO in the step 3) is inputted, a determination is made in a step S4 regarding whether or not any player character 41, which is displayed on a screen, is selected. In the step S4, the determination regarding whether or not any player character 41 being selected is made based on whether or not an inputted coordinates position is within a determination area that each player character 41 has. Also, note that the determination area is set in the initialization process mentioned above. Also, when a group has already been formed, a determination area of the group, besides the aforementioned determination area of a player character 41, will be subjected to the determination. The setting of a determination area for a group is executed by a touch OFF process (step S12).

Figure 17:
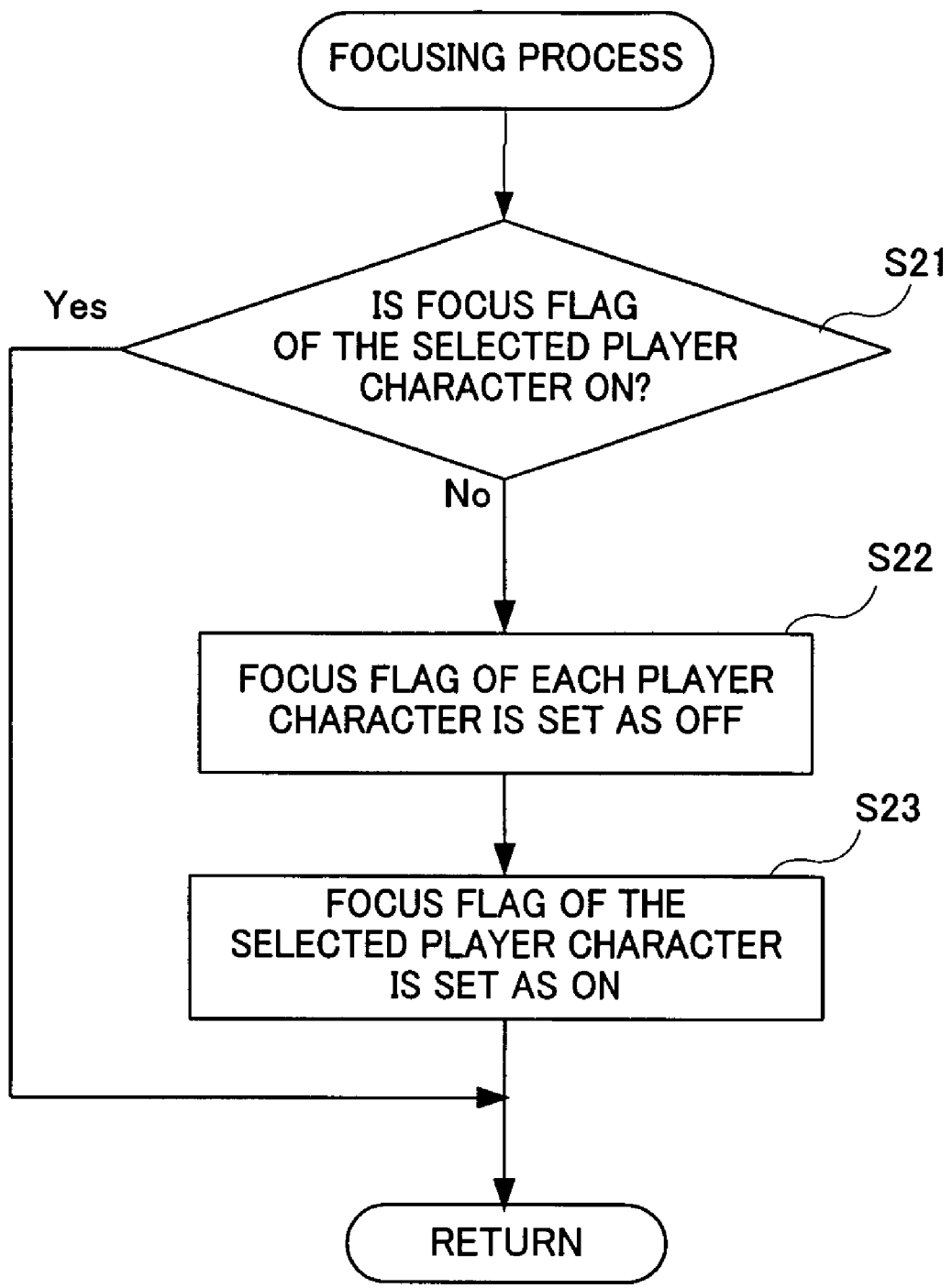
FIG. 17 is a flowchart illustrating details of a focus process indicated in step S5 in FIG. 16.

If it is determined in the step S4 that no player character 41 is selected (NO in the step S4), the process is advanced to a screen display process in step S7. On the other hand, if it is determined in the step S4 that a player character 41 is selected (YES in the step S4), in a step S5, which is a next step, a focus process is executed for putting the selected player character 41 in a selected state. FIG. 17 is a flowchart illustrating details of a focus process indicated in step S5. Here, by setting the focus flag 256 as ON, a process for turning the player character 41 into a focus character (a character in a state in which a player can operate it) is executed.

In FIG. 17, first, it is determined whether or not a focus flag of the selected player character is ON (step S21). If it is determined that the focus flag 256 is OFF (NO in the step S21), a focus flag 256 of each of the player character 41 is set as OFF in step S22. That is, the step S22 is executed so that a focus flag 256 of each of the player character 41 is set as OFF so as to release the selected state on an assumption that there is a character whose focus flag is ON. Next, in step S23, a focus flag 256 of the player character 41 which is selected above is set as ON. By this, even if there is a player character 41 which is in a selected state, a focus is shifted to a currently selected player character 41 so as to put the currently selected player character 41 into a selected state. On the other hand, if a focus flag 256 is, based on the determination from the step S21 mentioned above, already ON (YES in the step S21) meaning that an already existing focus character (a group) is selected (again), the current focus process ends. Note that, a focus character stands by at the position where the focus character is without any movement until it is operated by a player.

Figure 18:
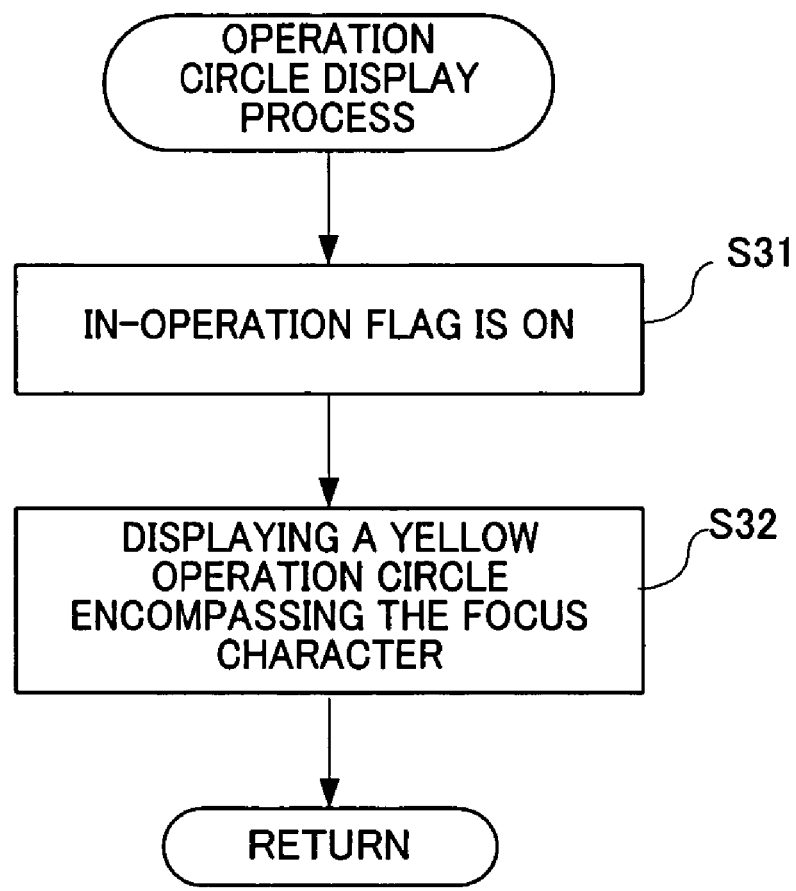
FIG. 18 is a flowchart illustrating details of an operation circle display process indicated in step S6 in FIG. 16.

Going back to FIG. 16, in step S6, an operation for displaying an operation circle 62 is executed. The operation circle 62 indicates that the focus character mentioned above is in-operation. FIG. 18 is a flowchart illustrating details of an operation circle display process which is indicated in the step S6. In FIG. 18, first, an in-operation flag 257 is set as ON (step S31). Then, an operation circle 62 having the focus character mentioned above being in the center of the circle is generated (step S32). This ends the operation circle display process.

Going back to FIG. 16, in step S7, a screen display process is executed. By this, each object or the like is displayed in the position after being shifted and with the operation circle 62 mentioned above. After this, in step S8, a determination is made on whether or not a game is over. When a condition for ending a game is not satisfied (YES in the step S8), the process goes back to the step S2 mentioned above. On the other hand, when a condition for ending a game is satisfied (NO in the step S8), the game process ends.

Next, a process (step S12) which is performed when it is determined in the aforementioned step S2 that there is no touch input (NO in the step S2) will be described. The process is performed when a stick 16 is removed from a touch panel 15, namely, when there is a touch off. Here, the process initializes an inputted coordinates list 252. Further, in the step S12, the in-operation flag 257 is set as OFF if the in-operation flag 257 is ON, and the aforementioned operation circle 62 is erased. Then, the process generates a standby-to-be-instructed-circle 61 replacing the operation circle 62. At this point, the process sets an area inside the standby-to-be-instructed-circle 61 as a determination area for the group. That is, while a player is touching the group (a focus character or an area inside the standby-to-be-instructed-circle 61) a yellow operation circle 62 is displayed indicating that the group is in an operatable state, and at a timing at which the player removes the stick 16 from the touch panel 15 the yellow operation circle 62 turns into a red standby-to-be-instructed-circle 61 in which the group stands by for an operation from the player. In other words, when and immediately after a player presses a player character 41 with a stick 16 a yellow operation circle 61 is displayed, and when the player removes the stick 16 from a touch panel and thereafter the operation circle 61 turns into a red standby-to-be-instructed-circle 61 (Note that an area inside the standby-to-be-instructed-circle 61 is equivalent to "related selected area").

On the other hand, when an in-operation flag 257 is OFF at a time of a touch off and thereafter, if a focus character (group) exists, a standby-to-be-instructed-circle 61 encompassing the focus character is generated (to be more accurate, this is a process updating the standby-to-be-instructed-circle 61—when a focus character exists already, it means that a standby-to-be-instructed-circle is already displayed), and if no focus character exists, the touch off process ends. This completes the touch off process of the step S12 illustrated in FIG. 16.

Next, a process which is executed when it is determined in the aforementioned step S3 that an input is a continuous input (YES in the step S3) will be described. First, in the step S9, it is determined whether or not an in-operation flag 257 is ON. If it is ON (YES in the step S9), it means that a player is in-operation with a focus character (group). Therefore, a process, which is executed during an in-operation, is to be executed (step S10). In the step 10, a process for, for example, moving the focus character or causing the focus character to attack an enemy character 43 is executed. In the present embodiment, detailed explanation for the process performed in the step S10 is omitted since the process is not directly related to the present invention.

On the other hand, when it is determined in the step S9 that the in-operation flag 257 is OFF, it means that a player is continuously touching a position other than the group on a screen. At this point, in a step S11, a process, which is executed during a non in-operation, is to be executed.

Figure 19:
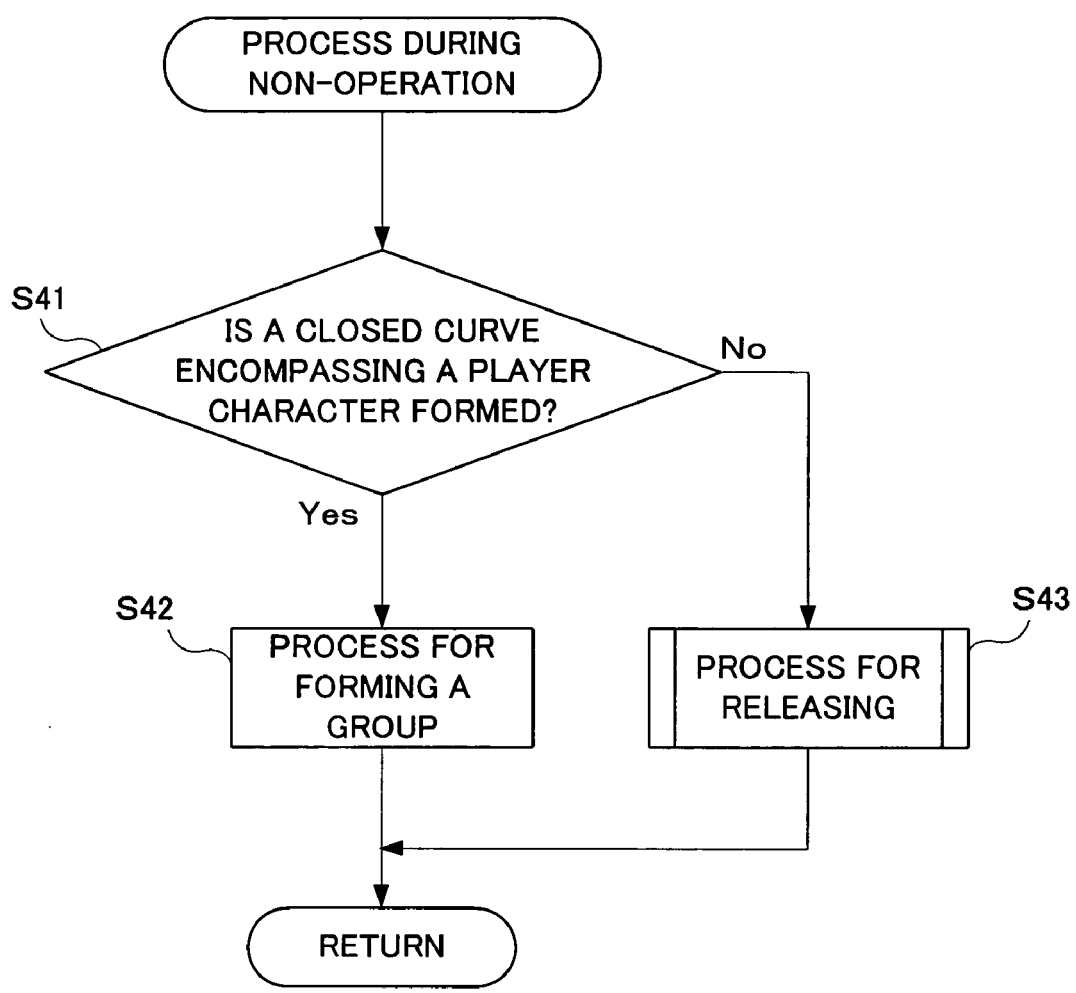
FIG. 19 is a flowchart illustrating details of a process performed during a non-operation in step S11 in FIG. 16.

FIG. 19 is a flowchart illustrating details of a process which is performed during a non in-operation indicated in the aforementioned step S11. In FIG. 19, first, it is determined whether or not an inputted track inputted by a player forms a closed curve encompassing any of player character 41 (step S41). This determination is made by considering, for example, whether a line connecting coordinates data detected in a given period of time crosses itself with reference to an inputted coordinates list 252. When it is determined in the step S41 that a single player character (or a plurality of player characters 41) is encompassed by the closed curve (YES in the step S41), a process for forming a group of the encompassed player character(s) 41 is executed. The process includes processes for setting a focus flag 256 for each of the player character 41 encompassed by the closed curve as ON, and setting a focus flag 256 for other player characters 41 as OFF. Details of the process performed in the step S42 are omitted since the process is not directly related to the present invention.

On the other hand, when it is determined in the step S41 that a player character is not encompassed (NO in the step S41), the process is advanced to a release process in a step S43. Hereinafter, the release process will be described with reference to FIG. 20 and FIG. 21.

Figure 20A:
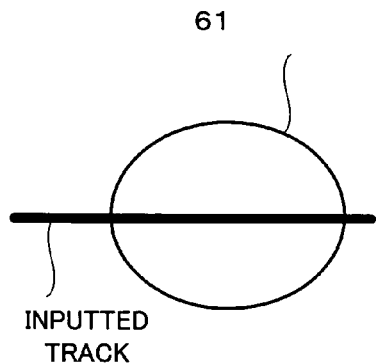
FIG. 20 is a diagram schematically illustrating a release process in S43 indicated in FIG. 19.
Figure 20B:
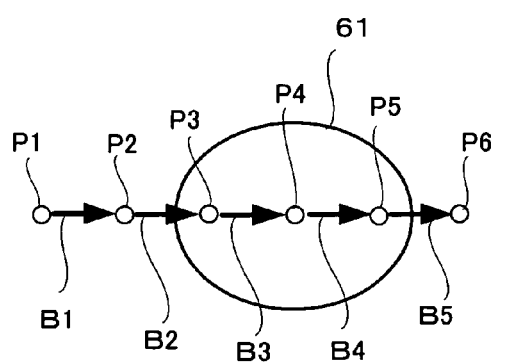
Figure 20C:
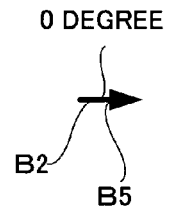

First, a summary of a release process in the step S43 will be described with reference to FIG. 20. FIG. 20 is a diagram schematically illustrating the release process mentioned above. First, an example in which a player moves a stick 16 in a horizontal manner across a standby-to-be-instructed-circle 61 as if to cut the circle as illustrated in FIG. 20(A) will be described. It is to be appreciated in this process that an inputted coordinates are detected six times (6 coordinates to be detected; P1 through P6 in FIG. 20(B)) via a touch panel 15. That is, six pieces of coordinates data, which correspond to P1 through P6, are to be stored in an inputted coordinates list 252 (See FIG. 14). As a result, when an operation is executed as illustrated in FIG. 20(A), vectors B1 through B5 are calculated successively. While each vector is being calculated, it is determined whether or not each vector intersects the standby-to-be-instructed-circle 61. When the result is as illustrated in FIG. 20(B), upon calculating a vector B2, a first intersection with the standby-to-be-instructed-circle 61 is detected. At this point, an intersection flag 258 is set as ON. Then, the vector B2 is stored as an initial intersection vector 253. Next, no intersection is detected from computation of vectors B3 and B4. A second intersection is detected upon computing a vector B5. At this point, the intersection flag 258 is already set as ON, which means that the intersection occurred for a second time. Then, it is determined whether or not an angle created by the vectors B5 and B2 (an inner product thereof) is smaller than a predetermined degree (e.g., 30 degrees). Suppose that the angle created by the two vectors is zero degree as illustrated in FIG. 20(B), then the angle satisfies the condition (see FIG. 20(C)). When the condition is satisfied, the focus flag 256 is set as OFF, and a process of, such as, releasing the group (that is, releasing the state in which aforementioned focus characters are selected) is executed.

Figure 20D:
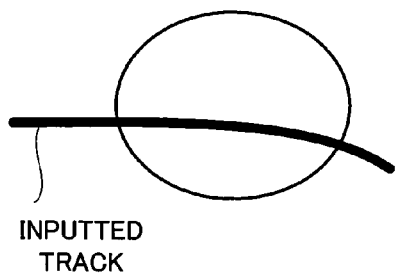
Figure 20E:
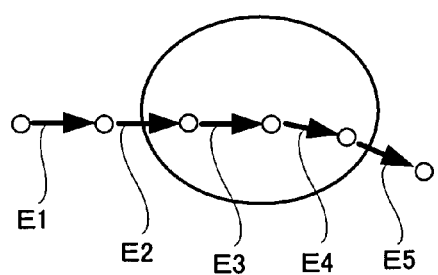
Figure 20F:
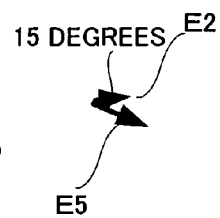
Figure 20G:
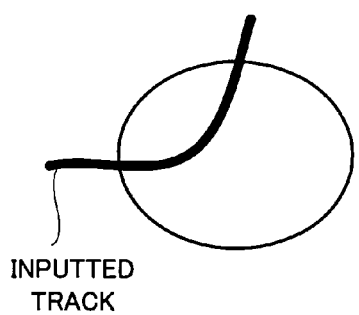
Figure 20H:
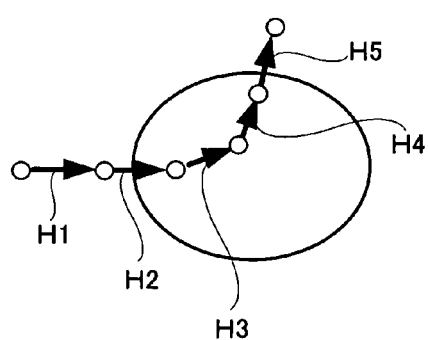
Figure 20I:
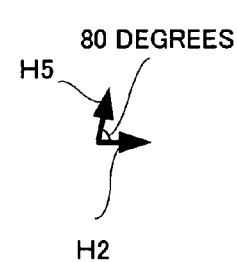

Also, when an inputted track cutting across a standby-to-be-instructed-circle 61 forms a slightly curved line as illustrated in FIG. 20(D), vectors E1 through E5 are calculated successively as illustrated in FIG. 20(E). In this case, an angle created by vectors E2 and E5 which intersect the standby-to-be-instructed-circle 61 is to be determined. The angle created by the vectors is, as illustrated in FIG. 20(F), 15 degrees and therefore satisfies the condition that the angle needs to be smaller than 30 degrees. Consequently, in this case also, as with the previous case, an operation of releasing the group is to be executed. On the other hand, when an operation is executed drawing a line which forms a large curve as illustrated in FIG. 20(G), vectors H1 through H5 are obtained as illustrated in FIG. 2(H). In this case, as illustrated in FIG. 20(I), the angle created by vectors H2 and H5 which intersect the standby to be instructed 61 is 80 degrees, and therefore fails to satisfy the condition that the angle needs to be smaller than 30 degrees. In this case, the release process ends without the process of releasing the group being executed.

Figure 21:
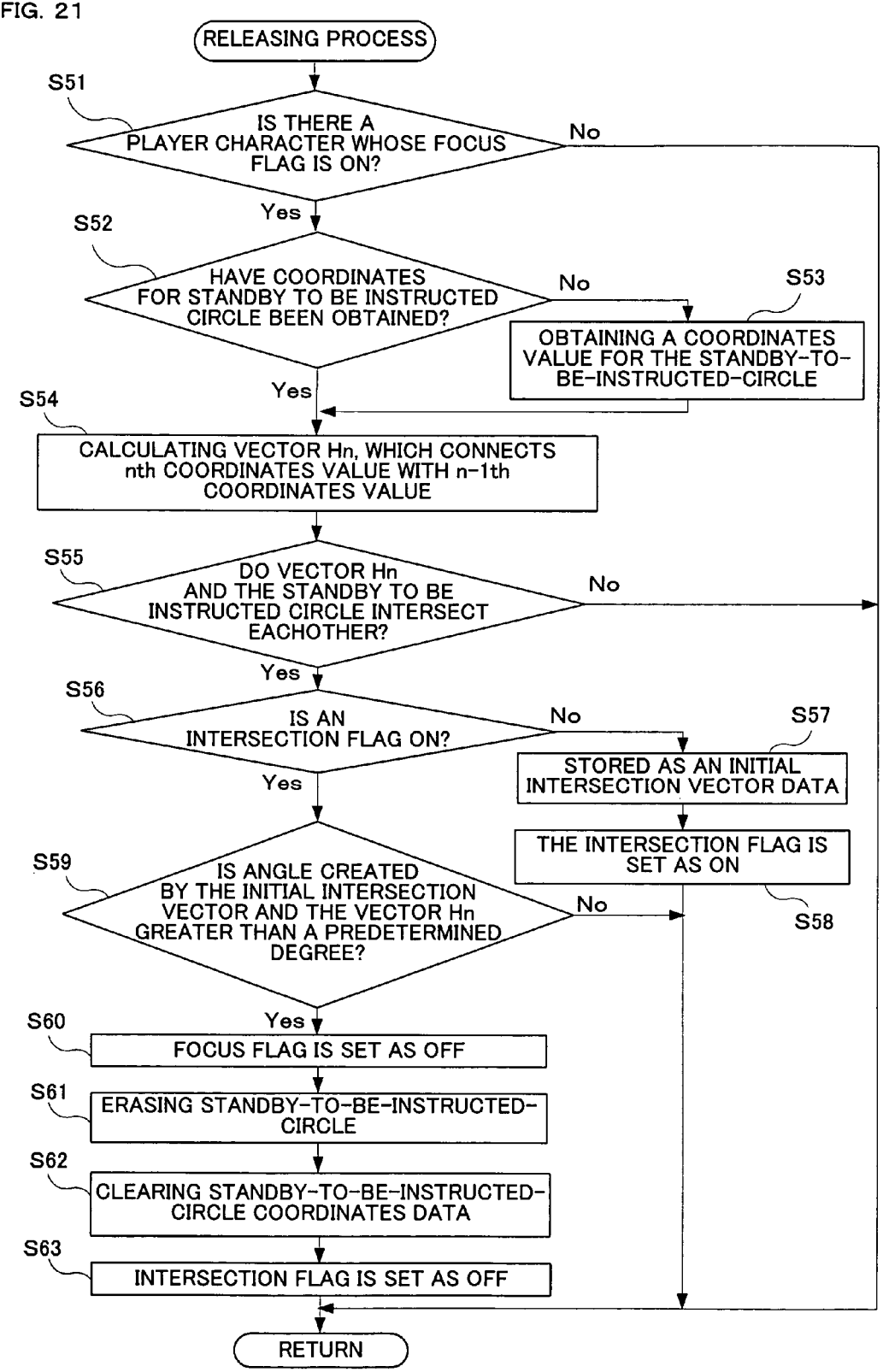
FIG. 21 is a flowchart illustrating details of the release process in S43 indicated in FIG. 19.

Next, with reference to FIG. 21, details of the aforementioned release process will be described. FIG. 21 is a flowchart illustrating details of the release process indicated in step S43. In FIG. 21, it is determined in step S51 whether or not there is a character whose focus flag 256 is ON (that is, whether or not there is a focus character (group) that is in standby for an instruction from a player). When there is no focus character, the release process ends. On the other hand, when there is a focus character (YES in step S51), it is determined whether or not standby-to-be-instructed-circle coordinates data 254 has already been obtained (step S52). The standby-to-be-instructed-circle coordinates data 254 is a group of coordinates values corresponding on a screen to positions where a standby-to-be-instructed-circle 61 encompassing the focus character is displayed. If the standby-to-be-instructed-circle coordinates data 254 has not been obtained yet, a group of coordinates values, which corresponds to positions in which a standby-to-be-instructed-circle 61 is displayed, is to be obtained and temporarily stored in storage (step S53). Then the process is advanced to step S54. On the other hand, if the standby-to-be-instructed-circle coordinates data 254 has already been obtained (YES in step S52), the process is advanced directly to step S54.

Then, in step S54, a vector data Hn, which connects (n−1)th coordinates data and nth coordinates data, is calculated (step S54) with reference to an inputted coordinates 252. Next, a group of coordinates values which corresponds to the vector Hn on a screen is calculated. Then, it is determined whether or not coordinates from the group of coordinates values of the vector data Hn match with those from the standby-to-be-instructed-circle coordinates data 254; that is, whether or not the vector Hn and the standby-to-be-instructed-circle 61 intersect each other is determined (step S55). When it is determined that there is no intersection (NO in step S55), the release process ends. On the other hand, when there is an intersection (YES in step S55), it is determined in a step S56, which is next, whether or not an intersection flag 258 is ON. This means that a determination is made, for a first time since this session of a touch input began, regarding whether or not an input inputted by a player intersects the standby-to-be-instructed-circle 61. If the intersection flag 258 is ON (NO in step S56), the vector data Hn is stored in storage as an initial intersection vector 253 in a step S57. Further, in step S58 the intersection flag 258 is set as ON. Then the release process ends.

Note that it is described, in the present embodiment, that by determining in the step S55 whether or not coordinates from a group of coordinates values composing vector data Hn match with those from the standby-to-be-instructed-circle coordinates data 254, it is determined whether or not vector Hn and a standby-to-be-instructed-circle 61 intersect each other, however, the present invention is not limited thereto. For example, it can be set such that a starting point and an end point of vector Hn are determined whether or not they are inside a standby-to-be-instructed-circle 61, and when either the starting point or the end point is positioned inside the circle and the other is positioned outside thereof, it is determined that the vector Hn and a standby-to-be-instructed-circle 61 intersect with each other. Especially, when a standby-to-be-instructed-circle 61 is circular or oval, it becomes easy to determine whether a starting point and an end point are inside or outside a standby-to-be-instructed-circle 61 with a simple calculation. For example, when a standby-to-be-instructed-circle 61 is a circular, it can be determined whether or not a starting (or an end) point of vector Hn is inside the standby-to-be-instructed-circle 61 by determining whether or not a distance between the center of the standby-to-be-instructed-circle 61 and the starting point (end point) of Hn is greater than the radius of the standby-to-be-instructed-circle 61.

On the other hand, when it is determined in the step S56 that the intersection flag 258 is ON, meaning that there has already been one intersection (YES in step S56), it is determined (step S59) whether or not an angle created by the initial intersection vector 253 stored in storage, and the vector Hn calculated in step S54 is greater than the predetermined degree. When the angle is not greater than the predetermined degree (NO in step S59), the release process ends. On the other hand, when the angle is greater than the predetermined degree (YES in step S59), a focus flag 256 is set as ON in step S60. Further, in step S61, the standby-to-be-instructed-circle 61 is erased. By this, the selected state of the focus character is released. The group is thus dispersed and each player character 41 which belonged to the group starts to act accordingly with its movement program. Then, in step S62, standby-to-be-instructed-circle coordinates data 254 which has been stored in storage is cleared. In step S63 which is to follow, the intersection flag 258 is set as OFF. This ends the release process. Then, going back to FIG. 19, the non in-operation process, too, ends.

Going back to FIG. 16, if a non in-operation process in step S11 ends, then, the aforementioned screen display process of step S7 is executed. Next, in step S8, it is determined whether or not a condition for ending a game is satisfied. When the condition for ending a game is not satisfied (NO in the step S8), the aforementioned step S2 is to be repeated. On the other hand, when the condition for ending a game is satisfied (YES in the step S8), the game process ends. This completes the game process according to the present embodiment.

As described above, according to the present embodiment, an area (group) which is selected by a player can be released (dispersing the group) from the state of being selected when the player uses a pointing device to cut across the area. By performing an operation of cutting across an area, a selected state of the area is to be released, which improves operability for a player. Further, as for the cutting across a selected area operation, unless an angle created by vectors intersecting an area for a first time and a second time is smaller than a predetermined degree, the aforementioned selected state release is not to be executed. By this, a selected state release is executed only when an intuitional input operation of "cutting" is executed, thereby allowing a player to operate with an intuition-based feel.

Although a standby-to-be-instructed-circle 61 indicating a selected state is a circular shape according to the embodiment described above, the shape of the circle is not limited thereto; a round-shaped closed area may be used to indicate a selected state instead. When a round-shaped closed area is used, in the aforementioned step S53, a group of coordinates values (a group of coordinates values of the borderline of the closed area) which is equivalent to the outline of the round-shaped closed area can be obtained instead of standby to be instructed to be instructed circle coordinates data 254. Then, in step S55, whether or not there are any coordinates corresponding to vector Hn match coordinates corresponding to the aforementioned outline (that is, whether or not vector Hn intersects the outline) is determined. The process performed thereafter is the same as the process following step S56, which is described with reference to FIG. 21, and therefore, detailed description is omitted.

Figure 22A:
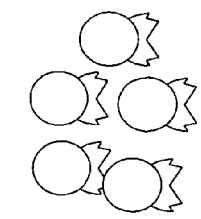
FIG. 22 is a diagram schematically illustrating an example of a release operation.
Figure 22B:
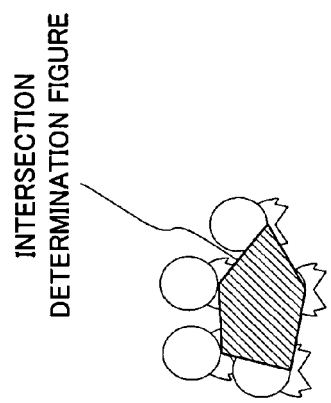
Figure 22C:
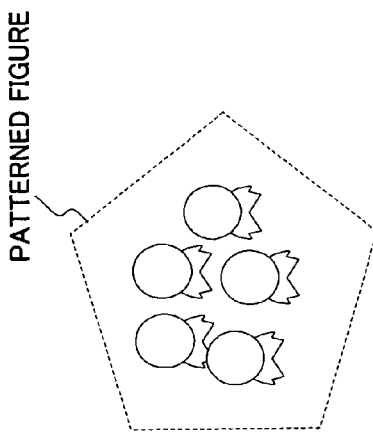

A standby-to-be-instructed-circle 61 indicating a selected state does not necessarily need to be displayed. A determination method regarding a release operation which is performed when a standby-to-be-instructed-circle 61 is not displayed will be described with reference to FIG. 22. FIG. 22(A) is a diagram illustrating a group while a focus flag for each character forming the group is ON when a standby-to-be-instructed-circle 61 is not displayed. Under such circumstance, the determination regarding the release operation can be made by using a figure (hereinafter, intersection determination figure) that is created by connecting a centroid of each focus character of the group. FIG. 22(B) is a diagram illustrating an example of an intersection determination figure. It needs to be determined whether or not an inputted track intersects (crosses) the intersection determination figure twice with regards to aforementioned steps S52 through S59. As illustrated in FIG. 22(C), the determination can also be made by reading a piece of data which is stored in storage accordingly with a patterned figure based on the number of focus character within a group, and overlapping the patterned figure to the center of the group as a substitute for an intersection determination figure. For example, the larger the number of focus characters in a group is, an accordingly large patterned figure is to be retrieved; the smaller the number of focus character in a group is, an accordingly small patterned figure is to be retrieved.

Figure 22D:
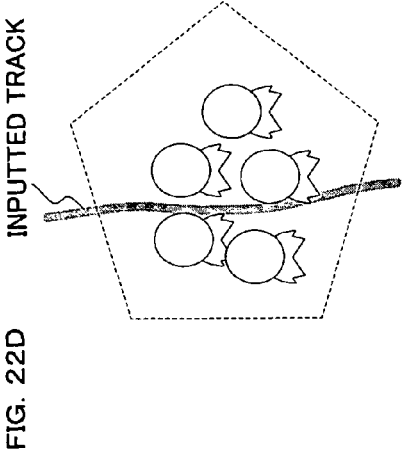
Figure 22E:
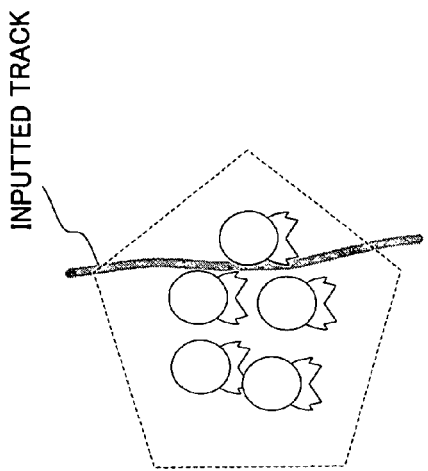

Further, when it is determined that an inputted track intersects the intersection determination figure twice, the selected area is divided at the inputted track, and the number of focus characters that exist inside each divided figure (area) is compared for a release operation to be performed. For example, suppose that there is an input crossing at the center of an intersection determination figure as illustrated in FIG. 22(D). Under such circumstance, the intersection determination figure is divided in half at the inputted track. Then the difference in the number of focus character (centroid thereof) in each figure (an area corresponding thereto) is calculated. Next, the release process as described above can be set so as to be executed when the difference is within a predetermined value (e.g., ±2). If an inputted track is as illustrated in FIG. 22(D), there are three focus characters in the right hand side of the track. In the meantime, there are two focus characters in the left hand side of the track. Then, the difference in the number of the focus characters is calculated (the number of focus characters on the right minus the number of focus character on the left) to be 1. As a result, it is determined that the difference is within the predetermined value, and the release process for the group is to be executed. On the other hand, suppose that an input is executed crossing an intersection determination figure at the right of the center as illustrated in FIG. 22(E). Under such circumstance, there is one focus character in the right hand side of the track and there are four focus characters in the left hand side of the track. Consequently, the difference is −3 and it will be determined that the difference is not within the predetermined value. Therefore, a release process for the group is not to be executed. If a release process is set to be executed according to a ratio of the number of focus character inside each figure (only when the number of character in each figure is similar to one another) after one intersection determination figure is divided, unnecessary release operation or unintentional release operation can be prevented. For example, even if a player, by accident, performs a crossing operation at the edge of an intersection determination figure (equivalent to FIG. 22(E)) when the player has no intention of dispersing an existing group, the invention of the present embodiment is able to prevent an unnecessary release process from being executed, thus operability is improved.

Also, a release process can be set such that an outline of a focus character forming a group is used as an intersection determination figure. When it is determined that an inputted track crosses one of focus characters in a group, a release process as described above is executed. This means that there will be a plurality of intersection determination figures inside one group. By this, if a large group is formed, simply drawing a short inputted track crossing over a focus character in the group can execute a release process as described above without drawing a long inputted track crossing the group, thus operability is improved.

Also, although an operation using a stick 16 (or a finger) is described as an example for the embodiment, the input method is not limited thereto: a mouse, for example, can be used as a pointing device. When a mouse is used, an operation of moving a mouse while a left mouse button is pressed continuously is equivalent to an operation of moving a stick 16 while the stick 16 is touching a touch panel 15 continuously. Also, an operation of removing a finger off the left mouse button will be equivalent to a touch off operation.

Also, a group is to be released (releasing a selected state) in the embodiment described above, however, a new group can be generated (generating a plurality of selected states) instead by a same method as in releasing a group. For example, if a release process as described above is executed on one group having six focus characters, two groups each having three focus characters are generated. Then, a player can optionally shift between the groups to operate one group at a time. As a result, the player is able to execute a plurality of tasks by operating the plurality of groups at a time, which allows the player to enjoy the game with more options.

While the invention has been described in detail, the foregoing description is in all aspects illustrative and not restrictive. It is understood that the numerous other modifications and variations can be devised without departing from the scope of the invention.

What is claimed is:

1. A non-transitory storage medium having stored therein a game program to be executed by a processor of a game device having a pointing device configured to instruct a position on a display screen on which a game image is displayed, the game program causing the computer to execute:
   selecting an object on the display screen;
   determining whether or not an inputted track inputted by a player is a track intersecting a related selected area which has been related to the selected object, based on a group of coordinates representing positions on the display screen outputted by the pointing device; and
   releasing a selection when it is determined that the inputted track inputted by the player is a track intersecting the related selected area.

2. The storage medium according to claim 1, wherein the game program comprises:
    executing, when the object is selected, a selection display indicating that the object is selected; and
    causing, when the selection is released, the computer to erase the selection display.

3. The storage medium according to claim 1, wherein the game program causes the computer to execute acquiring outline data, which indicates positions on the display screen corresponding to an outline of the related selected area,
    determining whether or not an inputted track inputted by a player is a track intersecting a related selected area includes determining, based on the outline data and a group of coordinates values which are outputted from the pointing device and which indicate positions on the display screen, whether or not the inputted track inputted by the player is a track intersecting the outline, and
    releasing a selection when it is determined that the inputted track inputted by the player is a track intersecting the related selected area includes releasing, when the intersection determination step determines that the track of the inputted track inputted by the player intersects the outline, the selection.

4. The storage medium according to claim 3, wherein the game program further causes the computer to execute:
    calculating, based on a group of coordinates values which are outputted from the pointing device and which indicate positions on the display screen, a plurality of pieces of vector data, which indicates a distance and a direction of each successive coordinates value;
    determining whether or not an inputted track inputted by a player is a track intersecting a related selected area includes determining whether or not there are at least two pieces of, among the plurality of pieces of vector data, vector data intersecting the outline part, and
    releasing a selection when it is determined that the inputted track inputted by the player is a track intersecting the related selected area includes releasing the selection when it is determined that at least two pieces of vector data intersect the outline.

5. The storage medium according to claim 4, wherein releasing a selection when it is determined that the inputted track inputted by the player is a track intersecting the related selected area includes releasing the selection when an angle derived between a first intersecting vector data and a second intersecting vector data among the plurality of pieces of vector data intersecting the outline is smaller than a predetermined angle.

6. The storage medium according to claim 3, wherein the game program further causes the computer to execute
    determining whether or not the inputted track inputted by the player formed a track circling the object, based on a group of coordinates values which are outputted from the pointing device and which indicate positions on the display screen; and
    selecting the object when it is determined that the inputted track inputted by the player formed a track circling the object.

7. The storage medium according to claim 1, wherein releasing a selection when it is determined that the inputted track inputted by the player is a track intersecting the related selected area includes determining whether or not the selected state of the related selected area is to be released depending on the ratio of a number of objects included in each of two divided areas which are created by a track intersecting the related selected area.

8. The storage medium according to claim 1, further comprising setting an area, which encompasses an object selected by the player as an operation object, as the related selected area.

9. The storage medium according to claim 1, further comprising setting a figure, which is created by connecting each object of the selected object group, as the related selected area.

10. A game device having a display screen for displaying a game image, and a pointing device provided in relation to the display screen, comprising:
    a processor; and
    a memory coupled to said processor, said memory storing instructions that, when executed by said processor, control said processor to:
    set, when either one of a given object group and a given area on the display screen is selected by a player, either the selected object group or the selected area on the screen as a related selected area;
    detect and successively store in the memory a coordinates value which is inputted by the pointing device and indicates a position on the display screen based on a signal outputted from the pointing device;
    determine whether or not an inputted track inputted by the player is a track intersecting with the related selected area based on a group of coordinates values stored in the memory; and
    release, when it is determined that the inputted track inputted by the player is a track intersecting the related selected area, the selected state of the selected area.

11. A non-transitory storage medium having stored therein a game program to be executed by a processor of a game device having a pointing device for instructing a position on a display screen on which a game image is displayed, the game program causing the computer to execute:
    grouping a group of objects on the display screen;
    determining whether or not an inputted track inputted by a player is a track intersecting a group related area which has been related the grouped group of objects, based on a group of coordinates values which are outputted from the pointing device and which indicate positions on the display screen; and
    releasing the grouping, when it is determined that the inputted track inputted by the player is a track intersecting the group related area.

12. A game device comprising:
    a memory having stored therein the game program according to claim 1; and
    a processor for executing the game program stored in the memory.

13. A method of indicating a position on a display screen on which a game image is displayed using a game device having a pointing device, comprising:
    selecting an object on the display screen;
    determining whether or not an inputted track inputted by a player is a track intersecting a related selected area which has been related to the selected object, based on a group of coordinates representing positions on the display screen outputted by the pointing device; and
    releasing a selection when it is determined that the inputted track inputted by the player is a track intersecting the related selected area.

14. A system including game device having a display screen for displaying a game image, and a pointing device provided in relation to the display screen, comprising:

a processor;

a memory coupled to said processor, said memory storing instructions that, when executed by said processor, control said processor to:

set, when either one of a given object group and a given area on the display screen is selected by a player, either the selected object group or the selected area on the screen as a related selected area;

detect and successively store in the memory a coordinates value which is inputted by the pointing device and indicates a position on the display screen based on a signal outputted from the pointing device;

determine whether or not an inputted track inputted by the player is a track intersecting with the related selected area based on a group of coordinates values stored in the memory;

release, when it is determined that the inputted track inputted by the player is a track intersecting the related selected area, the selected state of the selected area.

* * * * *